(12) United States Patent
Merkel

(10) Patent No.: US 7,294,164 B2
(45) Date of Patent: Nov. 13, 2007

(54) NARROW PORE SIZE DISTRIBUTION ALUMINUM TITANATE BODY AND METHOD FOR MAKING SAME

(75) Inventor: Gregory A. Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 112 days.

(21) Appl. No.: 11/193,123

(22) Filed: Jul. 28, 2005

(65) Prior Publication Data

US 2006/0021309 A1 Feb. 2, 2006

Related U.S. Application Data

(63) Continuation-in-part of application No. 10/902,381, filed on Jul. 29, 2004, now abandoned.

(51) Int. Cl.
*B01D 46/00* (2006.01)
*F01N 3/021* (2006.01)

(52) U.S. Cl. .............. 55/523; 55/282.3; 55/385.3; 55/DIG. 5; 55/DIG. 10; 55/DIG. 30; 60/311; 501/134; 501/135; 501/152; 264/628; 264/42; 264/DIG. 48

(58) Field of Classification Search .............. 55/282.2, 55/282.3, 385.3, 523, DIG. 5, DIG. 10, DIG. 30; 60/311; 501/5, 80, 128, 134, 135, 152; 264/628, 264/630, 638, 43, DIG. 48
See application file for complete search history.

(56) References Cited

U.S. PATENT DOCUMENTS

| | | | |
|---|---|---|---|
| 3,316,965 A | 5/1967 | Watanbe et al. ............. 166/33 |
| 4,118,240 A | 10/1978 | Takabatake ............. 106/73.33 |
| 4,194,917 A | 3/1980 | Sakemi et al. ............. 106/62 |
| 4,277,539 A | 7/1981 | Keller et al. ............. 428/450 |
| 4,306,909 A | 12/1981 | Oda et al. ............. 501/112 |
| 4,307,198 A | 12/1981 | Oda et al. ............. 501/119 |
| 4,327,188 A * | 4/1982 | Endo et al. ............. 501/134 |
| 4,483,944 A | 11/1984 | Day et al. ............. 502/439 |
| 4,595,665 A * | 6/1986 | Takayama et al. ............. 501/128 |
| 4,598,054 A | 7/1986 | Mochida et al. ............. 501/112 |
| 4,632,683 A * | 12/1986 | Fukutani et al. ............. 55/523 |
| 4,758,542 A | 7/1988 | Parker ............. 501/134 |
| 4,767,731 A | 8/1988 | Asami et al. ............. 501/128 |
| 4,855,265 A | 8/1989 | Day et al. ............. 501/128 |
| 4,900,703 A | 2/1990 | Ono et al. ............. 501/136 |
| 4,915,887 A | 4/1990 | Day et al. ............. 264/56 |
| 4,985,815 A | 1/1991 | Endo ............. 362/294 |
| 5,008,222 A | 4/1991 | Kameda ............. 501/134 |
| 5,153,153 A | 10/1992 | Freudenberg et al. ............. 501/127 |
| 5,223,318 A * | 6/1993 | Faber et al. ............. 55/523 |
| 5,288,672 A | 2/1994 | Gugel et al. ............. 501/134 |
| 5,290,739 A | 3/1994 | Hickman ............. 501/128 |
| 5,346,870 A | 9/1994 | Noguchi et al. ............. 501/136 |
| 5,422,324 A | 6/1995 | Noguchi et al. ............. 501/128 |
| 5,676,833 A | 10/1997 | Odaka et al. ............. 210/500.26 |
| 5,846,276 A | 12/1998 | Nagai et al. ............. 55/523 |
| 6,101,793 A | 8/2000 | Nagai et al. ............. 55/523 |
| 6,197,248 B1 | 3/2001 | Fukuda et al. ............. 264/658 |
| 6,620,751 B1 * | 9/2003 | Ogunwumi ............. 55/523 |
| 6,773,481 B2 | 8/2004 | Noguchi et al. ............. 55/523 |
| 6,814,774 B2 | 11/2004 | Ishihara et al. ............. 55/523 |
| 6,849,181 B2 | 2/2005 | Ogunwumi et al. ............. 210/510.1 |
| 7,141,089 B2 * | 11/2006 | Beall et al. ............. 55/523 |
| 2002/0004445 A1 * | 1/2002 | Beall et al. ............. 501/119 |
| 2003/0015829 A1 | 1/2003 | Fukada et al. ............. 264/674 |
| 2004/0020846 A1 * | 2/2004 | Ogunwumi et al. ............. 501/134 |
| 2004/0092381 A1 | 5/2004 | Beall et al. ............. 501/134 |
| 2004/0261384 A1 * | 12/2004 | Merkel et al. ............. 55/523 |
| 2005/0091952 A1 | 5/2005 | Ogunwumi et al. ............. 55/523 |

* cited by examiner

*Primary Examiner*—Jason M. Greene
(74) *Attorney, Agent, or Firm*—Randall S. Wayland; Joseph M. Homa

(57) ABSTRACT

This invention relates to an aluminum titanate body having a narrow pore size distribution as characterized by the relation $(d_{50}-d_{10})/d_{50}$ being less than 0.50 corresponding to a high degree of interconnected porosity. The body also preferably exhibits a low coefficient of thermal expansion of less than $15 \times 10^{-7}$ $C^{-1}$, high porosity of at least 38% by volume, and at least 0.10% by weight metal oxide, the metal being either yttrium, calcium, bismuth, a lanthanide metal or combinations of thereof. MOR is preferably at least 450 psi. Median pore diameter is preferably at least 8 microns. The inventive ceramic body is particularly useful as a wall-flow filter for a diesel exhaust. A method of fabrication is provided where the sintering temperature is preferably between 1375°-1550° C.

41 Claims, 7 Drawing Sheets

NARROW PORE SIZE DISTRIBUTION ALUMINUM TITANATE BODY AND METHOD FOR MAKING SAME

RELATED APPLICATIONS

The present invention is a continuation-in-part application of U.S. patent application Ser. No. 10/902,381 to G. Merkel filed Jul. 29, 2004 now abandoned and entitled "Mullite-Aluminum Titanate Body And Method For Making Same."

FIELD OF THE INVENTION

The present invention relates to an aluminum titanate ceramic body that has improved properties for use in high temperature applications and a method for making the same.

BACKGROUND OF THE INVENTION

Porous refractory ceramics have long been used as particulate filters in hot gas or corrosive environments such as advanced coal-based gas turbine cycles, municipal and industrial waste incinerators, and diesel or natural-gas engine exhaust systems. For such applications, ceramic particulate filters must possess chemical inertness, thermal shock resistance, high filtration efficiency, low pressure drop, and adequate strength. In particular, a diesel particulate filter (DPF) ideally combines low CTE (for thermal shock resistance), low pressure drop (for engine efficiency), high filtration efficiency (for removal of most particles from the exhaust stream), high strength (to survive handling, canning, and vibration in use), and low cost.

Candidate materials for DPFs include cordierite, silicon carbide and aluminum titanate based ceramics. Cordierite is attractive due to its low cost, low CTE, and good strength. However, the relatively low volumetric heat capacity (approximately 2.8 J cm$^{-3}$ °C.$^{-1}$ at 800K) and low thermal conductivity of cordierite can result in unacceptably high temperatures during operation when the filters are regenerated under certain conditions. Further, obtaining a well-interconnected pore microstructure in cordierite filters, in combination with low porosity required for high thermal mass, has been a challenge.

Silicon carbide filters have an advantage of a well-interconnected porosity for low pressure drop. Higher volumetric heat capacity (approximately 3.6 J cm$^{-3}$ °C.$^{-1}$ at 800K) and high thermal conductivity, coupled with a very high melting point, make silicon carbide thermally durable. However, silicon carbide is relatively expensive. Furthermore, the high coefficient of thermal expansion requires silicon carbide filters to be fabricated as cement-bonded segments, adding to manufacturing cost and raising concerns about their long-term thermo-mechanical durability.

Aluminum titanate (AT) based ceramics and specifically mullite-aluminum titanate (MAT) ceramics offer a very high volumetric heat capacity (approximately 3.9 to 4.0 J cm$^{-3}$ °C.$^{-1}$ for fully dense MAT at 800K) in combination with a low CTE. Further, AT and MAT ceramics have excellent chemical durability and high melting point.

However, in the manufacture of AT and MAT bodies, high sintering temperatures greater than 1600° C. are often required to achieve sufficient grain growth for microcracking and low thermal expansion. Such high heating temperatures add cost to manufacturing and final product. To reduce the sintering temperature some approaches have utilized the addition of chemical components. Nonetheless, such methods often result in a strong sensitivity of the physical properties, including CTE, porosity, or pore size, to the firing temperature, which is undesirable for manufacturability. Also, desired properties for DPF use are not expected to be achieved.

A need therefore exists to have an AT body that can be manufactured at lower sintering temperatures with properties that are useful for high temperature filtration applications. Further, there is a need for an AT body which has a narrow pore size distribution without sacrificing CTE, porosity, and strength.

SUMMARY OF THE INVENTION

AT ceramic bodies of the present invention offer narrow pore size distribution providing greater interconnectivity of the porosity. In particular, the ceramic body comprises 1. A ceramic body, comprises a phase of aluminum titanate and a narrow pore size distribution as characterized by the relation $(d_{50}-d_{10})/d_{50}$ being less than 0.50, a coefficient of thermal expansion (RT-1000° C.) less than $15 \times 10^{-7}$ C.$^{-1}$, a porosity of at least 38% by volume, and at least 0.10% by weight of a metal oxide for a metal selected from the group consisting of bismuth, calcium, yttrium, lanthanides and combinations thereof. Most preferably, the relation $(d_{50}-d_{10})/d_{50}$ is more preferably less than 0.35; and in some embodiments, less than 0.25, or even 0.23 or less. Most preferably, the relation $(d_{50}-d_{10})/d_{50}$ is less than 0.50 and greater than 0.18.

Further, the present invention AT ceramic body preferably also exhibits low thermal expansion and good thermal shock characteristics by exhibiting a coefficient of thermal expansion (RT-1000° C.) less than $15 \times 10^{-7}$ C.$^{-1}$, and more preferably less than $10 \times 10^{-7}$ C.$^{-1}$. Additionally, the AT ceramic body preferably also exhibits high porosity, of at least 38% by volume, and more preferably between 45-60% by volume. The preset invention AT body also achieves excellent strength, exhibiting a modulus of rupture (MOR) using the four point method on a cylindrical rod, of at least 450 psi; more preferably at least 500 psi; and in some embodiments, at least 600 psi or even at least 700 psi. Preferably also, the AT ceramic body may exhibit a median pore diameter of greater than 8 micrometers; more preferably between 10-20 micrometers.

The AT ceramic body is preferably fabricated at lower sintering temperatures, preferably between 1375° C.-1550° C., by using a metal oxide sintering additive in the raw material batch. The metal oxide is added in an amount preferably of at least 0.10% by weight, in some applications between 0.10%-5.0% by weight. The oxide relating to a metal is preferably selected from the group consisting of yttrium, bismuth, calcium, lanthanide metals, and combinations thereof.

In one embodiment, the inventive AT ceramic body exhibits a coefficient of thermal expansion (RT-1000° C.) less than $15 \times 10^{-7}$ C.$^{-1}$, a porosity of at least 38% by volume, a median pore diameter of at least 8 micrometers, and a narrow pore size distribution as characterized by the relation $(d_{50}-d_{10})/d_{50}$ being not more than 0.50 which corresponds to a high degree of interconnected porosity.

The inventive bodies are especially useful in high temperature applications including wall-flow filters for diesel exhaust filtration. In one such embodiment the filter is a plugged, wall-flow honeycomb body having a plurality of parallel end-plugged cell channels traversing the body from a frontal inlet end to an outlet end thereof The diesel exhaust particulate filter is preferably composed of the inventive AT ceramic and exhibits a coefficient of thermal expansion or CTE (RT-1000° C.) of not greater than $10 \times 10^{-7}$ C$^{-1}$, a porosity of between 45-60% by volume, a median pore diameter of between 10-20 micrometers, and a narrow pore size distribution as characterized by the relation $(d_{50}-d_{10})/d_{50}$ being less than 0.35 corresponding to a high degree of interconnected porosity. Some exemplary embodiments have pore size distributions characterized by the relation $(d_{50}-d_{10})/d_{50}$ being less than 0.3; or less than 0.25; or in some embodiments even 0.23 or less.

DETAILED DESCRIPTION OF PREFERRED EMBODIMENTS

Figure 1:
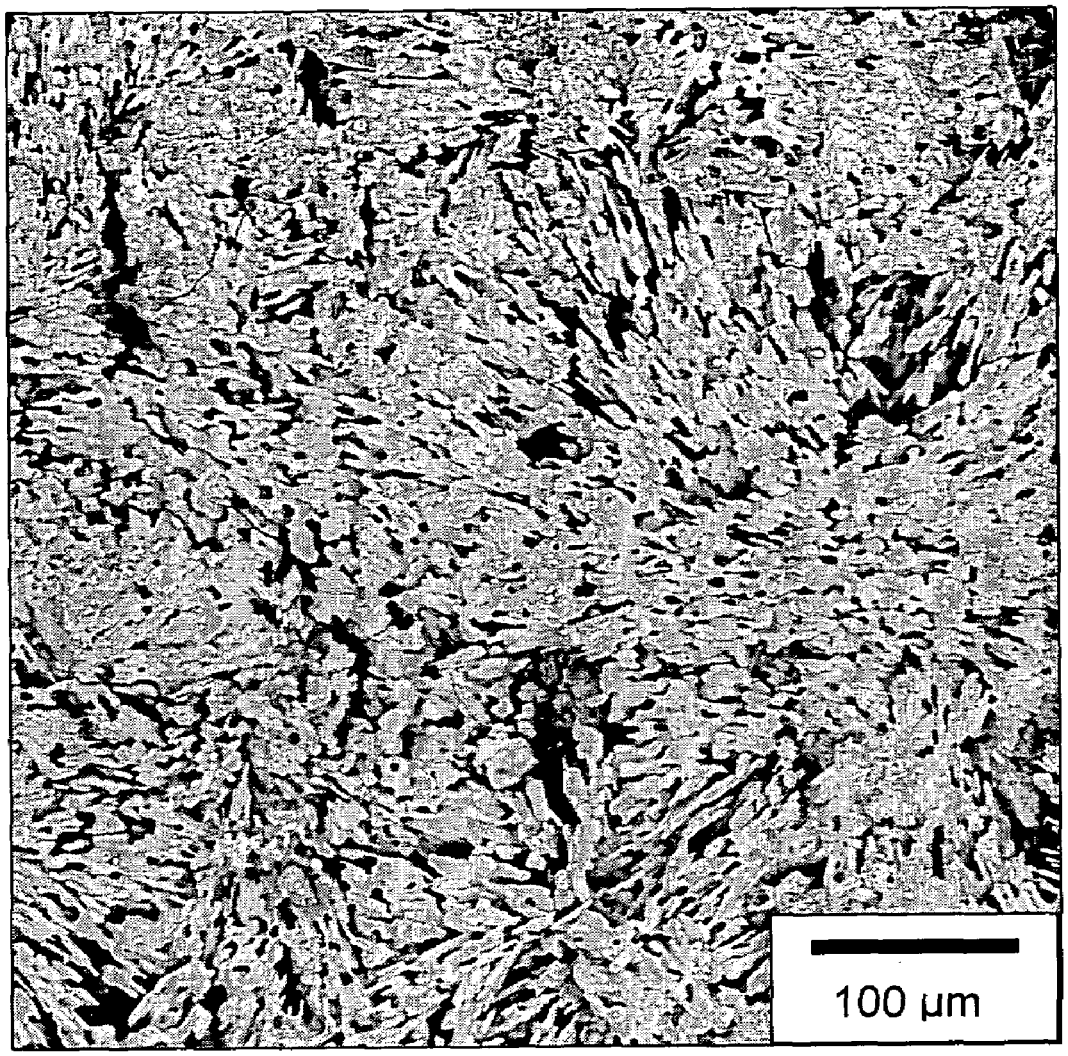
FIG. 1 is a scanning electron micrograph of the as-fired surface of Inventive Example 16, showing the unique domain-type microstructure of radiating crystals.

The ceramic body of the present invention is composed primarily an aluminum titanate phase, and also may preferably include a phase of mullite. Further, the body may also including at least 0.10% by weight of one or more metal oxides in which the metal is selected from the group consisting of bismuth, calcium, yttrium, lanthanides and combinations thereof. For certain applications the metal oxide is preferably limited to an amount of between 0.10% to 5.0% by weight.

It has been observed that the addition of one or more of the recited metal oxides lowers the coefficient of thermal expansion and also increases the median pore diameter without substantially reducing the amount of porosity in the fired body. A low CTE is desired for high thermal shock resistance, while a large median pore diameter contributes to low pressure drop, when used as an exhaust filter.

Furthermore, the metal oxide sintering additives enable the use of lower sintering temperatures. Also, the physical properties of the inventive bodies are not sensitive to the firing temperature employed such that conventional kilns without the need for sophisticated and expensive temperature controls can be used. Further, as a result of the metal oxide sintering additives used the physical properties are not sensitive such that the inventive AT bodies can be used at temperatures higher than the sintering temperatures used, for a period of duration of 5-10 hours or somewhat more.

In fabricating the inventive ceramic bodies, a raw material mixture is first provided. The inorganic powders are selected from sources of: (a) alumina such as corundum, gamma-alumina or another transitional alumina, boehmite, aluminum hydroxide (gibbsite) and mixtures thereof, (b) aluminosilicate such as mullite, kyanite, sillimanite, kaolin, calcined kaolin, pyrophyllite and mixtures thereof, (c) silica such as quartz, cristobalite, zeolite, diatomaceous earth, a silicon organometallic compound, fused silica, colloidal silica, other amorphous silica, and combinations thereof, and (d) titanium dioxide such as rutile, anatase, amorphous titania, and mixtures thereof. Optionally, pre-reacted aluminum titanate may be used as a raw material, but is not required nor desired.

It is important, and therefore preferable, that in the raw material mixture of powders the weighted average of the median particle or agglomerate diameters of the constituent inorganic powders, denoted $D_{50}$, is at least 6 microns. The value of $D_{50}$ is calculated as $D_{50} = \Sigma[(w_i)(d_{50,i})]/\Sigma(w_i)$ in which $w_i$ denotes the weight percentage of each inorganic powder exclusive of the metal oxide sintering additive, and $d_{50,i}$ is the median particle or agglomerate diameter of that same inorganic powder. The particle or agglomerate diameters are measured by a laser diffraction technique. A weighted average particle size of less than 6 microns would result in a pore size finer than 8 microns in the final AT ceramic, contrary to the desired properties of the present invention.

The alumina source preferably has a median particle size greater than 15 microns. When the particle size of the titania source is greater than 5 microns the porosity of the body is desirably increased without the need for large amounts of a pore-forming agent. Preferably, both the alumina source and titanium dioxide source have median particle or agglomerate diameters of at least 10 microns.

The raw material mixture further preferably includes a metal oxide sintering additive. Suitable metal oxides for purposes of the present invention include but are not limited to bismuth oxide, calcium carbonate, calcium hydroxide, calcium aluminate, calcium titanate, calcium silicate, yttrium or rare earth oxide, hydroxide, carbonate, fluoride-carbonate, aluminate, silicate, titanate, chloride, nitrate, acetate, or other soluble or insoluble salt, or a mixed rare earth concentrate such as bastnasite, calcined bastnasite, or monazite. The metal oxide sintering additive preferably has a median particle size of less than 5 microns, or is in a water-soluble state. The metal oxide additive is present in an amount of preferably at least 0.10% by weight, or preferably between 0.10% to 5.0% by weight super-addition to the other inorganic raw materials that react to form at least the aluminum titanate phase. By super-addition is meant that to 100 grams of inorganic raw material mixture are added for example between 0.10 to 5 grams of metal oxide.

Optionally, at least 0.05% by weight molybdenum oxide or tungsten oxide may be added to the raw material mixture. The addition of a molybdenum oxide or tungsten oxide source to the raw material mixture increases the amount of porosity in the fired ceramic, thus requiring less pore forming agent in the raw material mixture.

Optionally, a pore former may be added to tailor the porosity of the final ceramic body. The raw material mixture may include up to 20X grams per 100 grams of the inorganic raw materials, where X is the density of the pore former particle in grams per cubic centimeter. The pore forming agent may be any particulate material that undergoes combustion or vaporization during heating of the green body so as to leave behind pores after the sample has been fired.

Examples of pore forming agents include, but are not restricted to, graphite, amorphous carbon, cellulose, wood flour, nut shell flour, starches, and synthetic polymers such as polyethylene, polystyrene, and polyacrylate. The pore forming agent preferably has a median particle or agglomerate diameter of between 10-100 microns. Finer particle sizes result in an undesirably finer pore size and higher pressure drop when the body is used as a filtration device. Coarser particle sizes yield large pores than weaken the body and may result in reduced filtration efficiency if the body is used as a filter.

The raw materials and pore former are further mixed with organic and/or organometallic binders, lubricants, and plasticizers and aqueous or non-aqueous solvents to form a plastic mixture that can be shaped by any conventional means, such as by molding or extrusion through a die, such as, for example, to form a honeycomb structure. The green-formed body is then preferably dried and fired in air to a preferable peak temperature range of between about 1375° to 1550° C. And held for approximately 1 to 15 hours before cooling to room temperature.

AT ceramics according to the present invention preferably exhibit a low coefficient of thermal expansion (CTE) from a micro cracked structure, good thermal durability, good strength, and highly interconnected porosity. The amount of mullite in the AT body is estimated to be preferably between 2-60% by weight, and in some embodiments between 15-40% by weight.

In one embodiment the inventive ceramic body is characterized by the following properties: a coefficient of thermal expansion (RT-1000° C.) Less than $15 \times 10^{-7}$ $C^{-1}$, a porosity of at least 38% by volume, a median pore diameter of at least 8 micrometers, and a narrow pore size distribution as characterized by the relation $(d_{50}-d_{10})d_{50}$ being not more than 0.50 which corresponds to a high degree of interconnected porosity. The values $d_{10}$ and $d_{50}$ are defined as the pore diameters at 10% and 50% of the cumulative pore size distribution based upon volume, as measured by mercury porosimetry, with $d_{10}<d_{50}$. Thus, $d_{50}$ is the median pore diameter, and $d_{10}$ is the pore diameter at which 10% of the pores are finer, based upon volume.

A narrow pore size distribution corresponds to a greater interconnectivity of the porosity in the AT body, which results in a lower pressure drop under soot-loaded conditions when the body is used as a diesel particulate filter. The material strength of the AT ceramic, as indicated by the modulus of rupture (MOR) using the four point method on a cylindrical rod, is at least 500 psi.

In another embodiment the inventive AT ceramic is used in the fabrication of filters for diesel exhaust, and, in particular, as a wall-flow filter. A wall-flow filter comprises a plugged, honeycomb body having a plurality of parallel end-plugged cell channels traversing the body from a frontal inlet end to an outlet end thereof. Such structures are well known in the art. Part of the total number of cells at the inlet end are plugged along a portion of their lengths, and the remaining part of cells that are open at the inlet end are plugged at the outlet end along a portion of their lengths. This plugging configuration allows for engine exhaust passing through the cells of the honeycomb from the inlet end to the outlet end to flow into the open cells, through the cell walls, and out of the structure through the open cells in the outlet end. Suitable cellular densities for diesel particulate filters range from 70 cells/in² (10.9 cells/cm²) to 400 cells/in² (62 cells/cm²).

In another embodiment a DPF comprising the inventive material is preferably characterized by the following properties: a coefficient of thermal expansion (RT-1000° C.) not greater than $10 \times 10^{-7}$ $C^{-1}$, a porosity of between 45-60% by volume, a median pore diameter of between 10-20 micrometers, and a narrow pore size distribution as characterized by the relation $(d_{50}-d_{10})/d_{50}$ being not greater than 0.35 which corresponds to a high degree of interconnected porosity.

EXAMPLES

The invention is further illustrated with the following non-limiting examples. Inventive and comparative samples are prepared by admixing the inorganic raw materials, metal oxide additives, and pore-forming agents with 4 to 6 wt % methyl cellulose binder, 0.15 wt % triethanol amine, 1% tall oil, and 14 to 18 wt % water. The mixture is plasticized in a stainless steel muller and extruded as ⁵⁄₁₆-inch diameter rod and 1-inch, 2-inch, or 5.7-inch diameter honeycomb. Parts are dried and then fired in a gas or electric kiln at 1400° to 1500° C. And held for 4 to 10 hours.

After firing, the porosities of the samples are characterized by mercury porosimetry, the CTEs measured by dilatometry, and the modulus of rupture (MOR) by the four-point method on ⁵⁄₁₆-in diameter rods. MOR values are reported in pounds per square inch (psi). Some samples are also crushed and their crystalline phases identified by powder x-ray diffractometry. Pore diameters ($d_{10}$, $d_{50}$ and $d_{90}$) are in micrometers. The meanings of $d_{10}$ and $d_{50}$ has been defined previously. The value of $d_{90}$ is the pore diameter for which 90% of the pores, by volume, are finer in diameter thus $d_{10}<d_{50}<d_{90}$. Coefficients of thermal expansion are in units of $10^{-7\circ}$ $C.^{-1}$.

Selected 2-inch and 5.7-inch diameter parts, 6-inches long, are prepared as filters by plugging the ends of alternate channels on one face, and then plugging the ends of the adjacent channels on the opposite face, using a cold-set cement. Pressure drops across the length of the filters are measured at ambient temperature at air flow rates of 26.25 standard cubic feet per minute (scfm) on 2-inch diameter filters, and 210 scfm on the 5.7-inch diameter filters. The filters are then progressively loaded with artificial high surface area carbon soot at loadings from about 0.5 grams/liter to about 4.5 grams/liter, and the pressure drops measured at the same flow rate for each soot loading. Pressure drop values reported at 5 g/l soot loading are calculated by linear extrapolation of the data at lower soot loadings.

Median particle sizes of the raw materials used in the present inventive and comparative examples are listed in Table 1. Raw materials and properties of the examples are provided in Tables 2 to 23. Nominal percentages of aluminum titanate ($Al_2TiO_5$) and mullite ($3Al_2O_3$-$2SiO_2$) for each composition are by weight. All raw materials are also in parts by weight.

Examples prefixed by the letter "C" denote comparative (non-inventive) examples. Amounts of phases measured by powder XRD are denoted as major (M), minor (m), very minor (vm), trace (tr), small or very small trace (s.tr. And v.s.tr), or absent (0). Examples in Tables 2 to 19, and 23, were fired in electric furnaces; those in Tables 20-22 utilized either gas or electric furnaces, as indicated in the tables. In Tables 2-23, "MPS" denotes median particle size (diameter) in micrometers. MPS of the inorganic raw materials is equivalent to $D_{50}$ and is also in micrometers. In the examples of Tables 2 to 23, the MPS of all inorganic raw materials includes contributions from alumina, aluminum hydroxide, titania, kaolin, and quartz.

Examples C1 and C2 in Table 2 show that, in the absence of a metal oxide addition selected from the inventive group of compounds, ceramic bodies of aluminum titanate+mullite fired at 1400 or 1500° C. have a CTE greater than 15. Comparative examples C3 and C4 show that, although the addition of 2.78% $Y_2O_3$ reduces the CTE to less than 15, the median pore size is undesirably less than 8 microns when the weighted average of the median particle sizes of the inorganic raw materials is less than 6 microns.

Table 3 shows that, even when the weighted average of the median particle sizes of the inorganic raw materials is greater than 6 microns, the CTEs of the aluminum titanate+ mullite ceramics are greater than 15 and the median pore sizes are less than 8 microns in the absence of a metal oxide addition selected from the inventive group of compounds, regardless of whether the compositions are fired at 1400° C. or at 1500° C. Furthermore, in the absence of the inventive sintering additive, substantial amounts of unreacted alumina and titania are present when fired at 1400° C. for these coarse raw materials.

By contrast, the inventive examples in Table 4 demonstrate that, when the weighted average of the median particle sizes of the inorganic raw materials is greater than 6 microns and the raw materials mixture contains $Y_2O_3$, the CTEs of the aluminum titanate ceramics are less than 7 and the median pore sizes are greater than 8 microns when at least 1.0 wt % $Y_2O_3$ is added to this raw material mixture.

Figure 2:
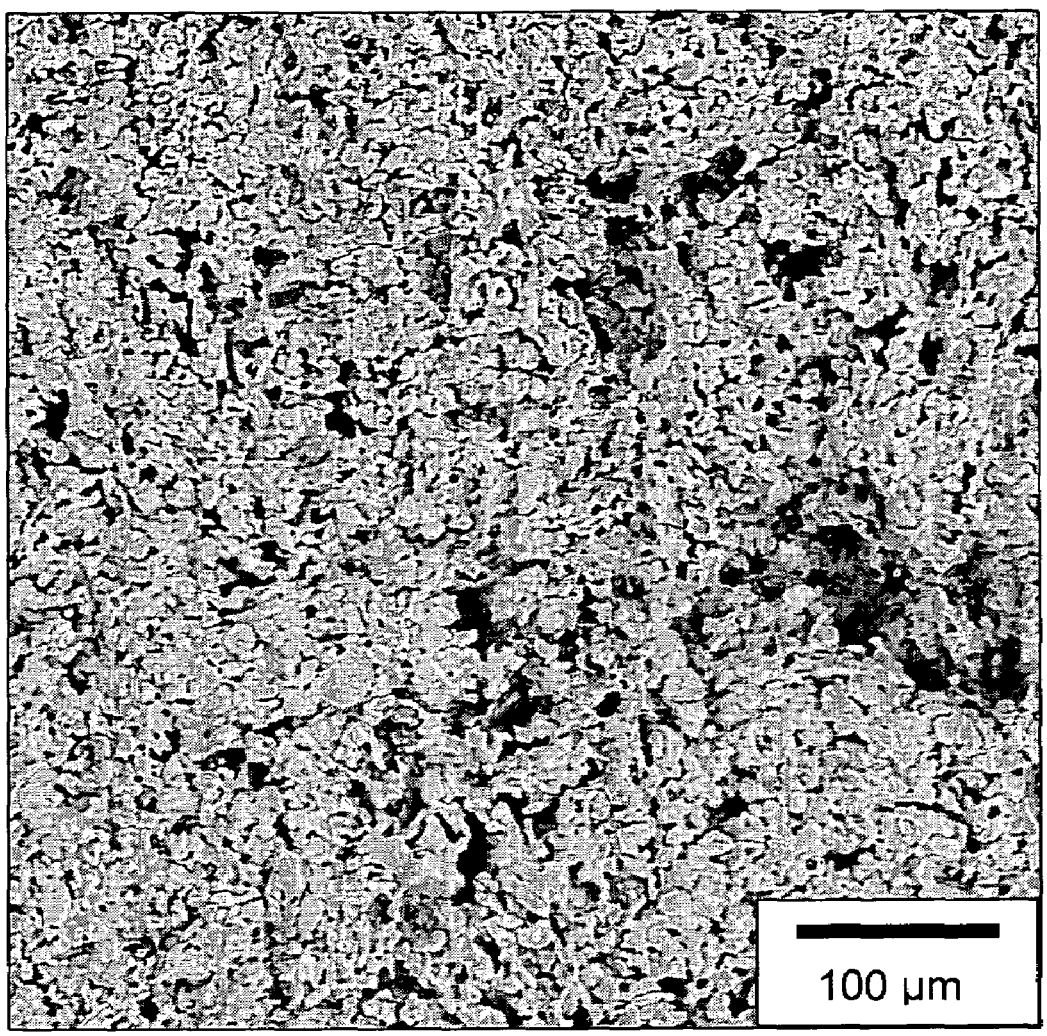
FIG. 2 is a scanning electron micrograph of the as-fired surface of Comparative Example C5, showing the absence of any groups of radiating crystals.

Examples 2 and 3 further show that the % porosity of the ceramic bodies is desirably increased by the addition of at least 1.0 wt % $MoO_3$ to the raw materials. FIG. 1 illustrates that the microstructure of Inventive Example 16 consists of "domains" of radiating aluminum titanate crystals. Such domains provide a unique microstructure that may influence the nature of the microcracking in the inventive ceramics. This microstructure is contrasted with that of Comparative Example C5 in FIG. 2, which depicts the lack of domains when an inventive metal oxide additive is absent.

The examples in Table 5 illustrate that firing the inventive compositions at 1500° C. still yields very low CTE and a median pore size greater than 8 microns while still preserving desirable high porosities. Thus, the inventive sintering additives do not result in excessive densification of the ceramic bodies with increasing temperature, and are therefore conducive to manufacturing processes that do not require stringent and expensive control of the firing temperature to within a very narrow range.

Tables 6 and 7 provide additional inventive examples based upon $Y_2O_3$ with or without $MoO_3$ for 80% aluminum titanate/20% mullite and 70% aluminum titanate/30% mullite compositions using various raw material combinations, some including kaolin as a source of silica and alumina, sintered at only 1400° C. Tables 8 and 9 show that inventive properties are still retained when these compositions are fired at 1500° C.

Figure 3:
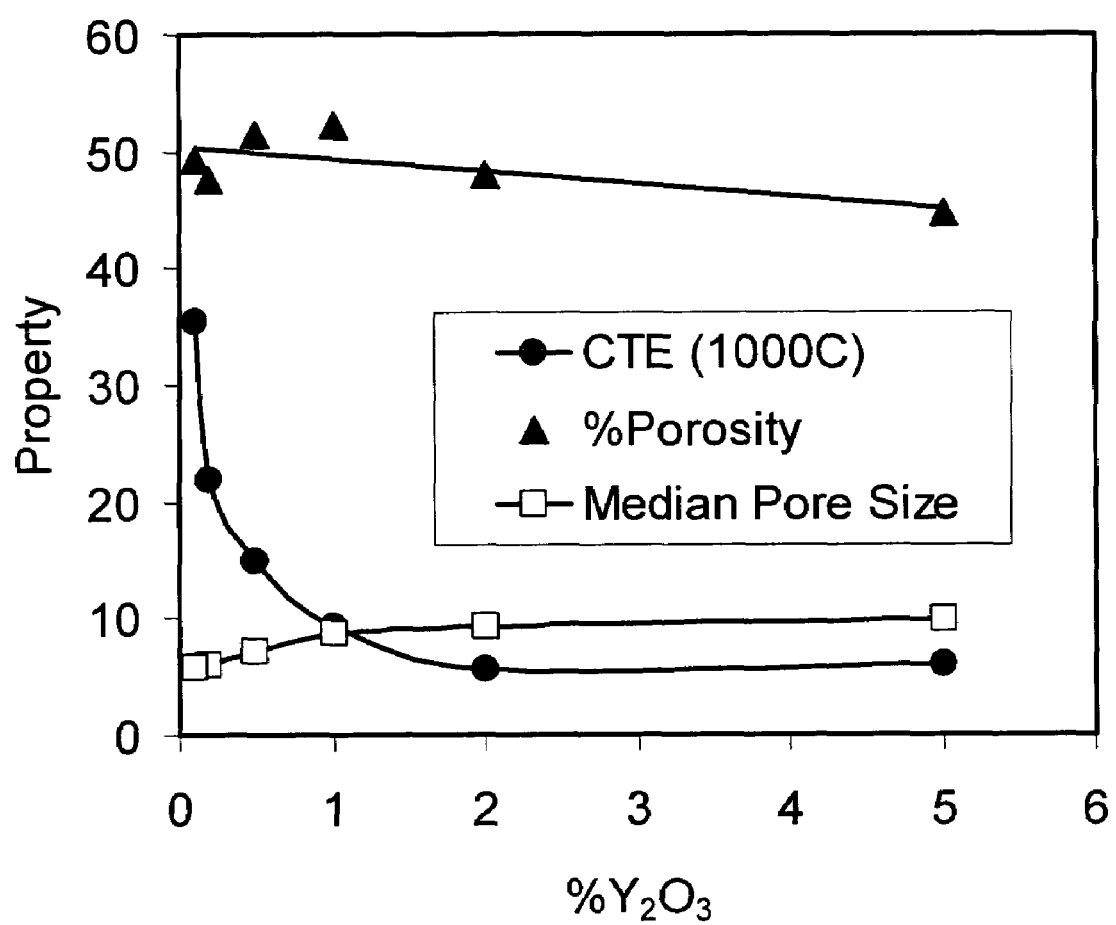
FIG. 3 shows the changes in % porosity, median pore diameter, and mean CTE (RT-1000° C.) as a function of the amount of $Y_2O_3$ added to the raw material mixture when fired at 1400° C.
Figure 4:
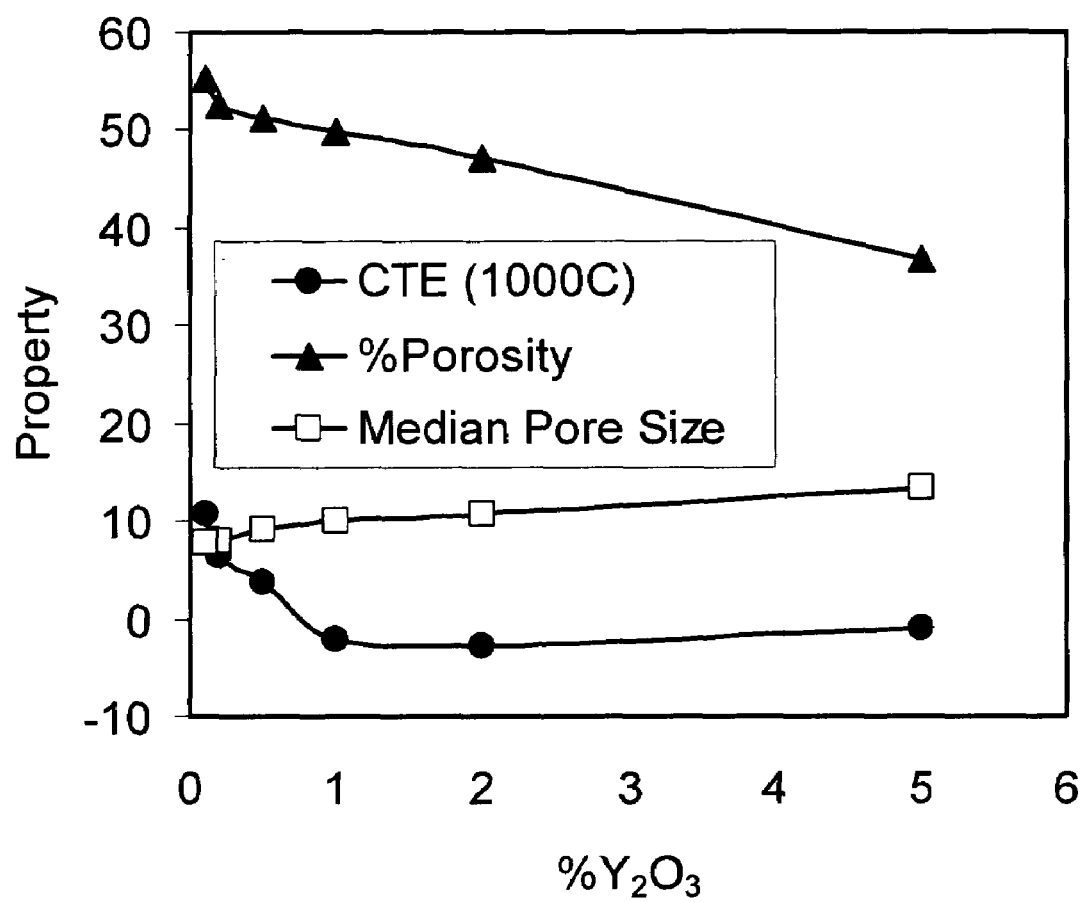
FIG. 4 shows the changes in % porosity, median pore diameter, and mean CTE (RT-1000° C.) as a function of the amount of $Y_2O_3$ added to the raw material mixture when fired at 1500° C.

Tables 10 and 11 characterize the dependence of the physical properties of the MAT ceramics on the amount of $Y_2O_3$ addition to the raw material mixture, and the results are shown in FIGS. 3 and 4. Table 10 illustrates that when an 80% aluminum titanate/20% mullite composition in which the weighted average of the median particle sizes of the inorganic raw materials is 9.3 microns is fired at 1400° C., more than 0.5% $Y_2O_3$ is required to maintain a median pore size of at least 8 microns and a CTE less than 15. Table 11 shows that when these compositions are fired at 1500° C., the amount of $Y_2O_3$ must be less than 5% to maintain at least 38% porosity and greater than 0.1% to maintain a median pore size greater than 8 microns. It will be appreciated that even lower amounts of $Y_2O_3$ could be utilized at 1500° C. if the weighted average of the median particle sizes of the raw materials was greater than 9.3 microns. FIGS. 3 and 4 show that an amount of $Y_2O_3$ between 1 and 3% is especially preferred for this raw material combination because the porosity, pore size, and CTE are relatively stable within this range of metal oxide addition.

The examples in Tables 12 and 13 show that, in addition to yttrium oxide, the oxides of the lanthanides metals, and their combinations, are effective in obtaining inventive bodies with useful CTE, porosity, and pore size. Examples 48 and 57 demonstrate that the lanthanide oxides may be provided in the form of a calcined ore comprised primarily of the oxides of lanthanum, cerium, praseodymium, and dysprosium.

Tables 14 and 15 illustrate that a source of calcium oxide, in this case calcium carbonate, is also effective as a sintering additive to promote low CTE and coarse pore size without reducing porosity. However, sources of the oxides of strontium, indium, and tin do not constitute inventive additives because they either result in high CTE or low strength.

Tables 16 and 17 demonstrate that the oxides of molybdenum, boron, niobium, tungsten, zinc, and zirconium alone are not effective sintering additives. However, bismuth oxide does serve as a useful sintering additive, provided that the firing temperature is greater than 1400° C., and the raw materials have a median pore size greater than 6 microns.

In example C29, the median pore size is smaller than 8 microns because $D_{50}$ of the inorganic raw materials is less than 6 microns. However, it will be appreciated that the median pore size the AT ceramic prepared with bismuth oxide addition can be increased to greater than 8 microns by the use of coarser raw materials while still preserving a CTE (RT-1000° C.) below $15 \times 10^{-7}$° $C.^{-1}$ and a porosity greater than 38%.

Figure 5:
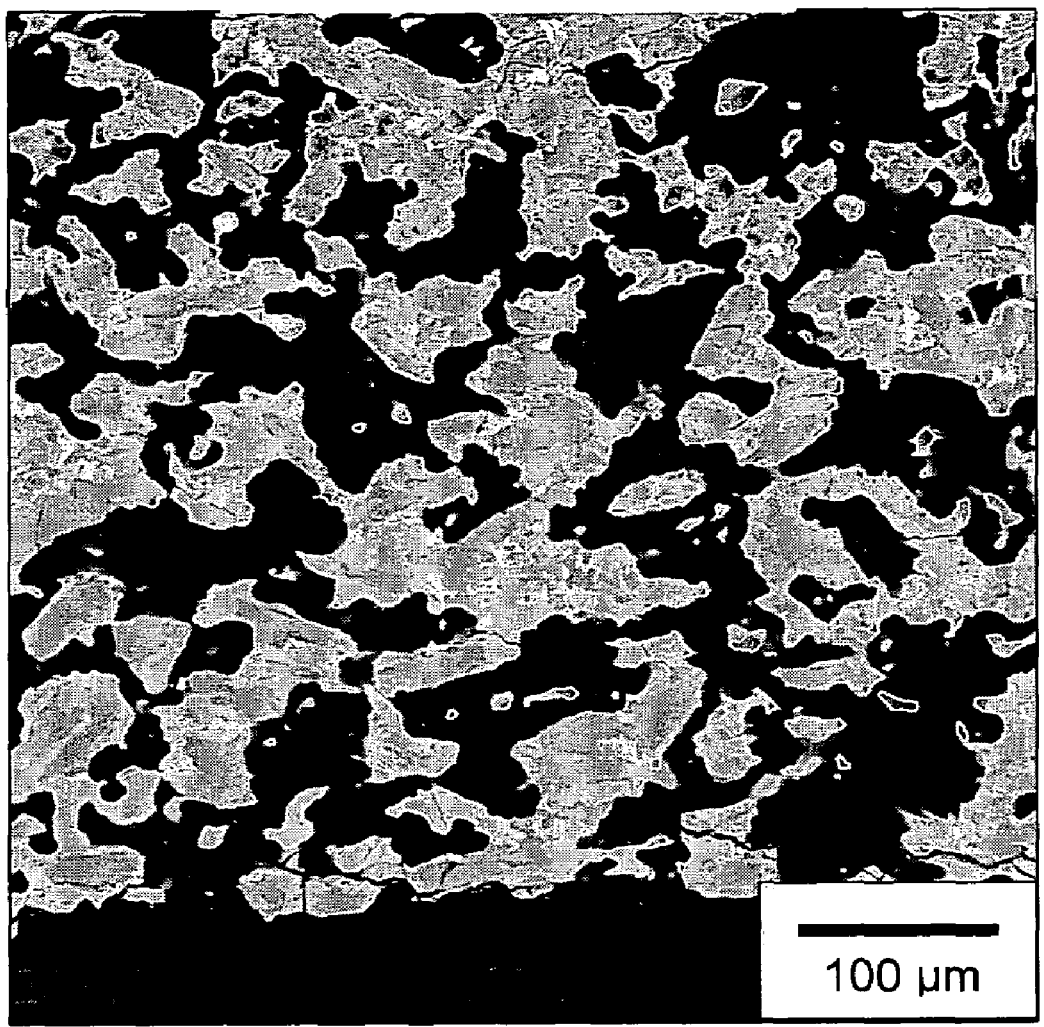
FIG. 5 is a scanning electron micrograph of a polished cross section of Inventive Example 60 showing the high degree of interconnected porosity of the inventive material.

Table 18 shows that, by increasing the median particle size of the alumina sources, the median pore size can be increased and a narrow pore size distribution maintained even when the particle size of the titania source remains very small. FIG. 5 depicts the well interconnected porosity of Inventive Example 66.

The examples in Table 19 illustrate that the particle size of both the titania and alumina sources can be varied while maintaining the inventive properties. Coarse titania is especially useful for increasing the porosity of the fired body without the need for larger amounts of additional pore forming agent.

Figure 6:
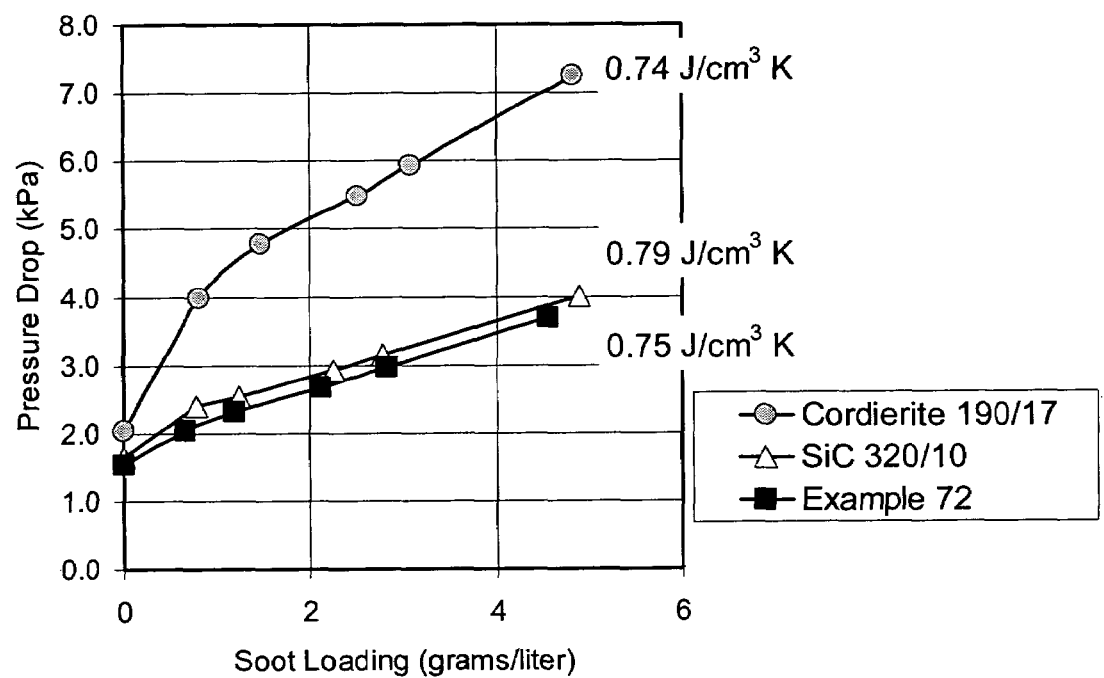
FIG. 6 shows the relationship between the pressure drop versus soot loading behavior of a commercially-available cordierite DPF, a silicon carbide DPF, and a DPF comprising the ceramic of Inventive Example 72, each having approximately the same heat capacity per unit volume.

Example 72 also shows that a filter prepared from the inventive body exhibits a very low clean and soot-loaded pressure drop as a diesel particulate filter. The full pressure drop versus soot loading curve measured at room temperature and a flow rate of 210 standard cubic feet per minute is depicted in FIG. 6 and compared with the pressure drop curves for cordierite and silicon carbide filters of the same size and approximately the same volumetric heat capacity measured under the same test conditions.

The three filters are all approximately 5.66 inches diameter and 6 inches in length, and pressure drops were all measured at room temperature and a flow rate of 210 standard cubic feet per minute. The cordierite example has a cell density of 190 cells/inch$^2$ and 0.017 inch walls. The silicon carbide example has a cell density of 320 cells/inch$^2$ and 0.010 inch walls. The inventive example has a cell density of 311 cells/inch$^2$ and 0.011 inch walls. The figure demonstrates the excellent low pressure drop exhibited by filters of the inventive material.

Figure 7:
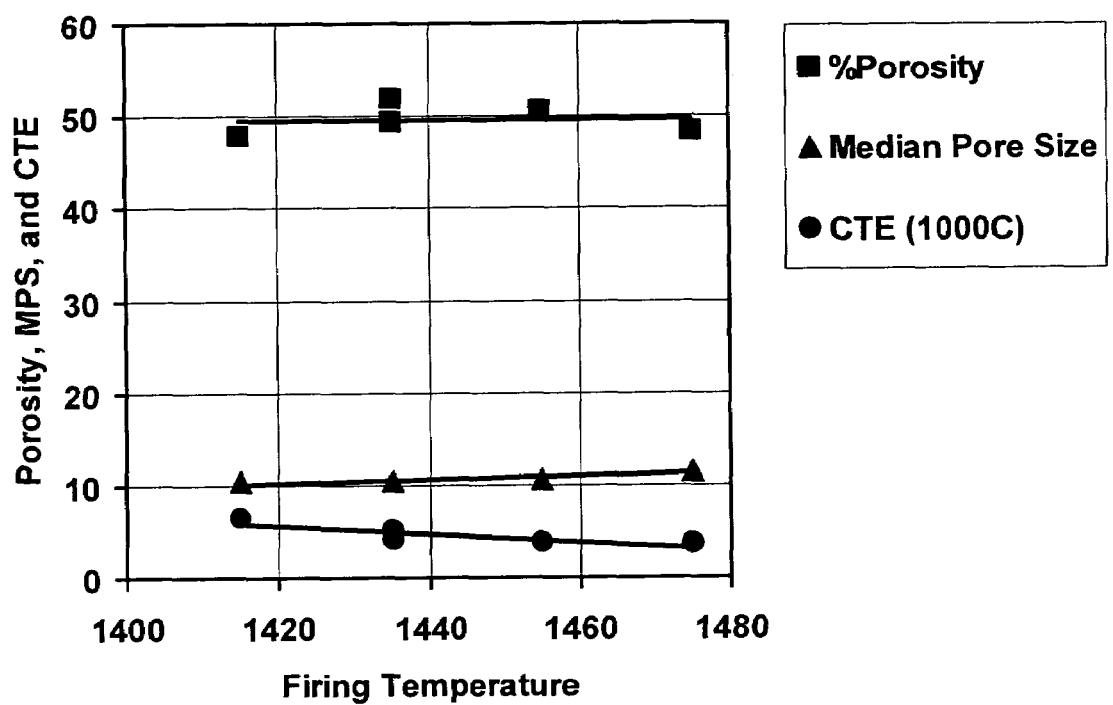
FIG. 7 shows the values for % porosity, median pore diameter (microns) and CTE (RT-1000° C., $10^{-7\circ}$ C.$^{-1}$) for Examples 89 to 93 plotted versus the temperature at which the examples were fired.

The examples of Tables 20 to 22 demonstrate that the CTE, porosity, and median pore size of the inventive materials do not change greatly for firing temperatures from 1415 to 1475° C., and that the inventive properties are obtained whether the body is fired in an electric kiln or a gas kiln. The properties for Inventive Examples 89-93 are plotted against the firing temperature in FIG. 7.

Table 23 shows the changes in length, CTE, and MOR of an inventive body after cycling 300 times between 200 and 1100° C. in air. The small differences after thermal cycling demonstrate the excellent dimensional and physical stability of the inventive examples.

While the invention has been described with respect to a limited number of embodiments, those skilled in the art, having benefit of the disclosure, will appreciate that other embodiments can be devised which do not depart from the scope of the invention as disclosed herein. Accordingly, the scope of the invention should be limited only by the attached claims.

TABLE 1

| Raw Material | Median Particle Diameter (microns) |
|---|---|
| Alumina A | 6.8 |
| Alumina B | 9.0 |
| Alumina C | 9.0 |
| Alumina D | 23.8 |
| Alumina E | 41.8 |
| Aluminum hydroxide A | 11.5 |
| Aluminum hydroxide B | 13.2 |
| Aluminum hydroxide C | 21.0 |
| Titania A | 0.50 |
| Titania B | 13.7 |
| Titania C | 22.7 |
| Kaolin A | 9.9 |
| Quartz A | 3.7 |
| Quartz B | 23.4 |
| Quartz C | 25.4 |

TABLE 1-continued

| Raw Material | Median Particle Diameter (microns) |
|---|---|
| Graphite A | 35.0 |
| Graphite B | 49.0 |

TABLE 2

| | Example Number | | | |
|---|---|---|---|---|
| | C1 | C2 | C3 | C4 |
| % Al$_2$TiO$_5$ | 80 | 80 | 80 | 80 |
| % Mullite | 20 | 20 | 20 | 20 |
| Weight Percent | | | | |
| Y$_2$O$_3$ | — | — | 2.78 | 2.78 |
| Alumina A | 53.52 | 53.52 | 53.52 | 53.52 |
| Titania A | 34.56 | 34.56 | 34.56 | 34.56 |
| Kaolin A | 11.92 | 11.92 | 11.92 | 11.92 |
| Graphite A | 25.00 | 25.00 | 25.00 | 25.00 |
| MPS Alumina sources | 6.8 | 6.8 | 6.8 | 6.8 |
| MPS Titania source | 0.50 | 0.50 | 0.50 | 0.50 |
| MPS Quartz | — | — | — | — |
| MPS Inorganic Raw Materials | 5.0 | 5.0 | 5.0 | 5.0 |
| Firing and Properties | | | | |
| Firing Temperature (° C.) | 1400 | 1500 | 1400 | 1500 |
| Hold Time (hours) | 4 | 4 | 4 | 4 |
| CTE (RT-1000° C.) | 44.8 | 28.1 | 12.3 | 5.7 |
| % Porosity | 48.8 | 51.4 | 47.9 | 38.9 |
| d$_{50}$ | 3.9 | 3.8 | 5.8 | 7.4 |
| d$_{10}$ | — | — | — | — |
| d$_{90}$ | — | — | — | — |
| (d$_{50}$ − d$_{10}$)/d$_{50}$ | — | — | — | — |
| (d$_{90}$ − d$_{10}$)/d$_{50}$ | — | — | — | — |
| MOR rod (psi) | 2335 | 1490 | 1141 | 1073 |
| Al$_2$TiO$_5$ | M | M | M | M |
| Mullite | m | m | m | m |
| Al$_2$O$_3$ | m | 0 | tr | tr |
| TiO$_2$ | m | 0 | 0 | 0 |

TABLE 3

| | Example Number | | | | | |
|---|---|---|---|---|---|---|
| | C5 | C6 | C7 | C8 | C9 | C10 |
| % Al$_2$TiO$_5$ | 80 | 90 | 95 | 80 | 90 | 95 |
| % Mullite | 20 | 10 | 5 | 20 | 10 | 5 |
| Weight Percent | | | | | | |
| MoO$_3$ | — | — | — | — | — | — |
| Y$_2$O$_3$ | — | — | — | — | — | — |
| Alumina C | 41.48 | 39.94 | 39.18 | 41.48 | 39.94 | 39.18 |
| Aluminum hydroxide B | 20.00 | 20.00 | 20.00 | 20.00 | 20.00 | 20.00 |
| Titania A | 33.27 | 37.43 | 39.51 | 33.27 | 37.43 | 39.51 |
| Quartz A | 5.25 | 2.62 | 1.31 | 5.25 | 2.62 | 1.31 |
| Graphite A | 25.00 | 25.00 | 25.00 | 25.00 | 25.00 | 25.00 |
| MPS Alumina sources | 10.4 | 10.4 | 10.4 | 10.4 | 10.4 | 10.4 |

TABLE 3-continued

|  | Example Number | | | | | |
|---|---|---|---|---|---|---|
|  | C5 | C6 | C7 | C8 | C9 | C10 |
| MPS Titania source | 0.50 | 0.50 | 0.50 | 0.50 | 0.50 | 0.50 |
| MPS Quartz | 3.7 | 3.7 | 3.7 | 3.7 | 3.7 | 3.7 |
| MPS Inorganic Raw Materials | 6.7 | 6.5 | 6.4 | 6.7 | 6.5 | 6.4 |
| Firing and Properties | | | | | | |
| Firing Temperature (° C.) | 1400 | 1400 | 1400 | 1500 | 1500 | 1500 |
| Hold Time (hours) | 4 | 4 | 4 | 4 | 4 | 4 |
| CTE (RT-1000° C.) | 50.1 | 44.3 | 36.8 | 33.5 | 28.2 | 22.7 |
| % Porosity | 49.8 | 50.4 | 49.9 | 52.6 | 55.4 | 54.6 |
| $d_{50}$ | 4.4 | 4.4 | 4.6 | 6.7 | 6.2 | 6.3 |
| $d_{10}$ | 2.2 | 2.1 | 2.1 | 3.4 | 3.1 | 3.2 |
| $d_{90}$ | 9.0 | 8.7 | 8.4 | 14.5 | 20.6 | 13.2 |
| $(d_{50} - d_{10})/d_{50}$ | 0.50 | 0.51 | 0.53 | 0.50 | 0.51 | 0.50 |
| $(d_{90} - d_{10})/d_{50}$ | 1.55 | 1.50 | 1.36 | 1.66 | 2.83 | 1.60 |
| MOR rod (psi) | 2084 | 1264 | 1145 | 2209 | 1623 | 1523 |
| $Al_2TiO_5$ | M | M | M | M | M | M |
| Mullite | m | tr | 0 | m | tr | 0 |
| $Al_2O_3$ | M | M | M | tr | m | m |
| $TiO_2$ | M | M | M | tr | m | m |

TABLE 4

|  | Example Number | | | | |
|---|---|---|---|---|---|
|  | 1 | 2 | 3 | 4 | 5 |
| % $Al_2TiO_5$ | 80 | 80 | 80 | 90 | 95 |
| % Mullite | 20 | 20 | 20 | 10 | 5 |
| Weight Percent | | | | | |
| $MoO_3$ | — | 2.61 | 1.30 | — | — |
| $Y_2O_3$ | 2.78 | 1.39 | 2.78 | 2.73 | 1.35 |
| Alumina C | 41.48 | 41.48 | 41.48 | 39.94 | 39.18 |
| Aluminum hydroxide B | 20.00 | 20.00 | 20.00 | 20.00 | 20.00 |
| Titania A | 33.27 | 33.27 | 33.27 | 37.43 | 39.51 |
| Quartz A | 5.25 | 5.25 | 5.25 | 2.62 | 1.31 |
| Graphite A | 25.00 | 25.00 | 25.00 | 25.00 | 25.00 |
| MPS Alumina sources | 10.4 | 10.4 | 10.4 | 10.4 | 10.4 |
| MPS Titania source | 0.50 | 0.50 | 0.50 | 0.50 | 0.50 |
| MPS Quartz | 3.7 | 3.7 | 3.7 | 3.7 | 3.7 |
| MPS Inorganic Raw Materials | 6.7 | 6.7 | 6.7 | 6.5 | 6.4 |
| Firing and Properties | | | | | |
| Firing Temperature (° C.) | 1400 | 1400 | 1400 | 1400 | 1400 |
| Hold Time (hours) | 4 | 4 | 4 | 4 | 4 |
| CTE (RT-1000° C.) | 6.8 | 4.1 | 3.2 | −0.8 | −5.1 |
| % Porosity | 51.8 | 53.7 | 54.5 | 45.9 | 46.4 |
| $d_{50}$ | 9.2 | 8.5 | 9.7 | 8.5 | 8.3 |
| $d_{10}$ | 5.8 | 5.3 | 6.4 | 6.1 | 5.7 |
| $d_{90}$ | 17.6 | 17.9 | 20.4 | 30.2 | 15.1 |
| $(d_{50} - d_{10})/d_{50}$ | 0.37 | 0.37 | 0.34 | 0.28 | 0.31 |
| $(d_{90} - d_{10})/d_{50}$ | 1.28 | 1.48 | 1.44 | 2.83 | 1.13 |
| MOR rod (psi) | 602 | 793 | 586 | 946 | 897 |
| $Al_2TiO_5$ | M | M | M | M | M |
| Mullite | m | m | m | 0 | 0 |
| $Al_2O_3$ | tr | tr | vm | tr | m |
| $TiO_2$ | vm | tr | vm | tr | tr |

TABLE 5

|  | Example Number | | | | | | |
|---|---|---|---|---|---|---|---|
|  | 6 | 7 | 8 | 9 | 10 | 11 | 12 |
| % $Al_2TiO_5$ | 80 | 80 | 80 | 80 | 90 | 90 | 95 |
| % Mullite | 20 | 20 | 20 | 20 | 10 | 10 | 5 |
| Weight Percent | | | | | | | |
| $MoO_3$ | 2.61 | 2.61 | 1.30 | — | — | — | — |
| $Y_2O_3$ | 1.39 | 2.78 | 2.78 | 2.78 | 1.36 | 2.73 | 1.35 |
| Alumina C | 41.48 | 41.48 | 41.48 | 41.48 | 39.94 | 39.94 | 39.18 |
| Aluminum hydroxide B | 20.00 | 20.00 | 20.00 | 20.00 | 20.00 | 20.00 | 20.00 |
| Titania A | 33.27 | 33.27 | 33.27 | 33.27 | 37.43 | 37.43 | 39.51 |

TABLE 5-continued

| | Example Number | | | | | | |
|---|---|---|---|---|---|---|---|
| | 6 | 7 | 8 | 9 | 10 | 11 | 12 |
| Quartz A | 5.25 | 5.25 | 5.25 | 5.25 | 2.62 | 2.62 | 1.31 |
| Graphite A | 25.00 | 25.00 | 25.00 | 25.00 | 25.00 | 25.00 | 25.00 |
| MPS Alumina sources | 10.4 | 10.4 | 10.4 | 10.4 | 10.4 | 10.4 | 10.4 |
| MPS Titania source | 0.50 | 0.50 | 0.50 | 0.50 | 0.50 | 0.50 | 0.50 |
| MPS Quartz | 3.7 | 3.7 | 3.7 | 3.7 | 3.7 | 3.7 | 3.7 |
| MPS All Inorganic Raw Materials | 6.7 | 6.7 | 6.7 | 6.7 | 6.5 | 6.5 | 6.4 |
| | Firing and Properties | | | | | | |
| Firing Temperature (°C.) | 1500 | 1500 | 1500 | 1500 | 1500 | 1500 | 1500 |
| Hold Time (hours) | 4 | 4 | 4 | 4 | 4 | 4 | 4 |
| CTE (RT-1000° C.) | −3.6 | −5.9 | −2.8 | 0.8 | −4.9 | −7.6 | −12.5 |
| % Porosity | 52.5 | 50.9 | 51.8 | 48.2 | 47.7 | 44.9 | 44.4 |
| $d_{50}$ | 9.8 | 10.8 | 11.5 | 10.4 | 9.9 | 10.6 | 10.5 |
| $d_{10}$ | 6.8 | 8.3 | 8.8 | 8.3 | 7.0 | 8.4 | 8.1 |
| $d_{90}$ | 14.9 | 15.4 | 56.4 | 16.5 | 17.8 | 44.0 | 17.7 |
| $(d_{50} - d_{10})/d_{50}$ | 0.31 | 0.23 | 0.23 | 0.20 | 0.29 | 0.21 | 0.23 |
| $(d_{90} - d_{10})/d_{50}$ | 0.83 | 0.65 | 4.14 | 0.78 | 1.09 | 3.36 | 0.91 |
| MOR rod (psi) | 1040 | 1018 | 842 | 736 | 1063 | 1195 | 954 |
| $Al_2TiO_5$ | M | M | M | M | M | M | M |
| Mullite | m | m | m | m | tr | tr | 0 |
| $Al_2O_3$ | m | m | m | tr | tr | m | tr |
| $TiO_2$ | 0 | 0 | tr | tr | tr | tr | v s. tr |

TABLE 6

| | Example Number | | | | |
|---|---|---|---|---|---|
| | 13 | 14 | 15 | 16 | 17 |
| % $Al_2TiO_5$ | 80 | 80 | 80 | 80 | 80 |
| % Mullite | 20 | 20 | 20 | 20 | 20 |
| | Weight Percent | | | | |
| $MoO_3$ | 2.00 | 2.00 | — | 2.00 | — |
| $Y_2O_3$ | 2.00 | 2.00 | 2.00 | 2.00 | 2.00 |
| Alumina C | 41.48 | 41.48 | 41.48 | 36.18 | 36.18 |
| Aluminum hydroxide C | 20.00 | 20.00 | 20.00 | 20.00 | 20.00 |
| Titania A | 33.27 | 33.27 | 33.27 | 32.73 | 32.73 |
| Kaolin A | — | — | — | 11.09 | 11.09 |
| Quartz B | 5.25 | 5.25 | 5.25 | — | — |
| Graphite A | 25.00 | — | — | — | — |
| Graphite B | — | 25.00 | 25.00 | 25.00 | 25.00 |
| MPS Alumina sources | 12.9 | 12.9 | 12.9 | 13.3 | 13.3 |
| MPS Titania source | 0.50 | 0.50 | 0.50 | 0.50 | 0.50 |
| MPS Quartz | 23.4 | 23.4 | 23.4 | — | — |
| MPS All Inorganic Raw Materials | 9.3 | 9.3 | 9.3 | 8.7 | 8.7 |
| | Firing and Properties | | | | |
| Firing Temperature (°C.) | 1400 | 1400 | 1400 | 1400 | 1400 |
| Hold Time (hours) | 4 | 4 | 4 | 4 | 4 |
| CTE (RT-1000° C.) | 6.6 | 0.5 | 8.3 | 1.7 | 4.8 |
| % Porosity | 49.2 | 52.1 | 49.5 | 53.4 | 51.2 |
| $d_{50}$ | 10.1 | 11.1 | 10.5 | 8.6 | 8.6 |
| $d_{10}$ | 6.3 | 6.7 | 6.0 | 4.9 | 4.6 |
| $d_{90}$ | 14.2 | 13.1 | 23.4 | 17.7 | 19.7 |
| $(d_{50} - d_{10})/d_{50}$ | 0.37 | 0.40 | 0.42 | 0.43 | 0.46 |
| $(d_{90} - d_{10})/d_{50}$ | 0.79 | 0.58 | 1.65 | 1.48 | 1.76 |
| MOR rod (psi) | 710 | 721 | 793 | 604 | 768 |
| $Al_2TiO_5$ | M | M | M | M | M |
| Mullite | m | m | m | m | m |
| $Al_2O_3$ | tr | tr | tr | tr | tr |
| $TiO_2$ | tr | tr | tr | tr | tr |

TABLE 7

| | Example Number | | | | |
|---|---|---|---|---|---|
| | 18 | 19 | 20 | 21 | 22 |
| % $Al_2TiO_5$ | 70 | 70 | 70 | 70 | 70 |
| % Mullite | 30 | 30 | 30 | 30 | 30 |
| | Weight Percent | | | | |
| $MoO_3$ | 2.00 | 2.00 | — | 2.00 | — |
| $Y_2O_3$ | 2.00 | 2.00 | 2.00 | 2.00 | 2.00 |
| Alumina C | 43.01 | 43.01 | 43.01 | 35.10 | 35.10 |
| Aluminum hydroxide C | 20.00 | 20.00 | 20.00 | 20.00 | 20.00 |
| Titania A | 29.12 | 29.12 | 29.12 | 28.40 | 28.40 |
| Kaolin A | — | — | — | 16.50 | 16.50 |
| Quartz B | 7.87 | 7.87 | 7.87 | — | — |
| Graphite A | 25.00 | — | — | — | — |
| Graphite B | — | 25.00 | 25.00 | 25.00 | 25.00 |
| MPS Alumina sources | 12.8 | 12.8 | 12.8 | 13.4 | 13.4 |
| MPS Titania source | 0.50 | 0.50 | 0.50 | 0.50 | 0.50 |
| MPS Quartz | 23.4 | 23.4 | 23.4 | — | — |
| MPS All Inorganic Raw Materials | 10.1 | 10.1 | 10.1 | 9.1 | 9.1 |
| | Firing and Properties | | | | |
| Firing Temperature (°C.) | 1400 | 1400 | 1400 | 1400 | 1400 |
| Hold Time (hours) | 4 | 4 | 4 | 4 | 4 |
| CTE (RT-1000° C.) | 8.9 | 8.6 | 8.4 | 14.0 | 14.1 |
| % Porosity | 51.5 | 53.9 | 52.7 | 53.8 | 54.0 |
| $d_{50}$ | 10.3 | 11.1 | 11.3 | 8.1 | 8.1 |
| $d_{10}$ | 6.1 | 5.9 | 5.8 | 4.4 | 4.0 |
| $d_{90}$ | 15.3 | 21.2 | 22.9 | 14.9 | 18.8 |
| $(d_{50} - d_{10})/d_{50}$ | 0.41 | 0.47 | 0.48 | 0.46 | 0.50 |
| $(d_{90} - d_{10})/d_{50}$ | 0.89 | 1.39 | 1.52 | 1.30 | 1.81 |

TABLE 7-continued

| | Example Number | | | | |
|---|---|---|---|---|---|
| | 18 | 19 | 20 | 21 | 22 |
| MOR rod (psi) | 876 | 663 | 1091 | 726 | 765 |
| $Al_2TiO_5$ | M | M | M | M | M |
| Mullite | m | m | m | m | m |
| $Al_2O_3$ | tr | tr | tr | v.s.tr | s.tr |
| $TiO_2$ | tr | tr | tr | v.s.tr | s.tr |

TABLE 8

| | Example Number | | | | |
|---|---|---|---|---|---|
| | 23 | 24 | 25 | 26 | 27 |
| % $Al_2TiO_5$ | 80 | 80 | 80 | 80 | 80 |
| % Mullite | 20 | 20 | 20 | 20 | 20 |
| | Weight Percent | | | | |
| $MoO_3$ | 2.00 | 2.00 | — | 2.00 | — |
| $Y_2O_3$ | 2.00 | 2.00 | 2.00 | 2.00 | 2.00 |
| Alumina C | 41.48 | 41.48 | 41.48 | 36.18 | 36.18 |
| Aluminum hydroxide C | 20.00 | 20.00 | 20.00 | 20.00 | 20.00 |
| Titania A | 33.27 | 33.27 | 33.27 | 32.73 | 32.73 |
| Kaolin A | — | — | — | 11.09 | 11.09 |
| Quartz B | 5.25 | 5.25 | 5.25 | — | — |
| Graphite A | 25.00 | — | — | — | — |
| Graphite B | — | 25.00 | 25.00 | 25.00 | 25.00 |
| MPS Alumina sources | 12.9 | 12.9 | 12.9 | 13.3 | 13.3 |
| MPS Titania source | 0.50 | 0.50 | 0.50 | 0.50 | 0.50 |
| MPS Quartz | 23.4 | 23.4 | 23.4 | — | — |
| MPS All Inorganic Raw Materials | 9.3 | 9.3 | 9.3 | 8.7 | 8.7 |
| | Firing and Properties | | | | |
| Firing Temperature (° C.) | 1500 | 1500 | 1500 | 1500 | 1500 |
| Hold Time (hours) | 4 | 4 | 4 | 4 | 4 |
| CTE (RT-1000° C.) | -2.0 | -8.4 | 0.1 | -4.5 | -2.2 |
| % Porosity | 47.6 | 50.2 | 47.0 | 50.7 | 47.3 |
| $d_{50}$ | 11.2 | 11.6 | 11.6 | 10.0 | 10.0 |
| $d_{10}$ | 8.2 | — | 7.6 | 6.5 | 6.8 |
| $d_{90}$ | 37.3 | — | 20.8 | 19.4 | 19.2 |
| $(d_{50} - d_{10})/d_{50}$ | 0.27 | — | 0.34 | 0.35 | 0.32 |
| $(d_{90} - d_{10})/d_{50}$ | 2.60 | — | 1.14 | 1.29 | 1.24 |
| MOR rod (psi) | 593 | 489 | 706 | 489 | 670 |
| $Al_2TiO_5$ | M | M | M | M | M |
| Mullite | m | m | m | m | m |
| $Al_2O_3$ | v.s.tr | v.s.tr | s.tr | s.tr | tr |
| $TiO_2$ | v.s.tr | v.s.tr | s.tr | v.s.tr | v.s.tr |

TABLE 9

| | Example Number | | | | |
|---|---|---|---|---|---|
| | 28 | 29 | 30 | 31 | 32 |
| % $Al_2TiO_5$ | 70 | 70 | 70 | 70 | 70 |
| % Mullite | 30 | 30 | 30 | 30 | 30 |
| | Weight Percent | | | | |
| $MoO_3$ | 2.00 | 2.00 | — | 2.00 | — |
| $Y_2O_3$ | 2.00 | 2.00 | 2.00 | 2.00 | 2.00 |
| Alumina C | 43.01 | 43.01 | 43.01 | 35.10 | 35.10 |
| Aluminum hydroxide C | 20.00 | 20.00 | 20.00 | 20.00 | 20.00 |
| Titania A | 29.12 | 29.12 | 29.12 | 28.40 | 28.40 |
| Kaolin A | — | — | — | 16.50 | 16.50 |
| Quartz B | 7.87 | 7.87 | 7.87 | — | — |
| Graphite A | 25.00 | — | — | — | — |
| Graphite B | — | 25.00 | 25.00 | 25.00 | 25.00 |
| MPS Alumina sources | 12.8 | 12.8 | 12.8 | 13.4 | 13.4 |
| MPS Titania source | 0.50 | 0.50 | 0.50 | 0.50 | 0.50 |
| MPS Quartz | 23.4 | 23.4 | 23.4 | — | — |
| MPS All Inorganic Raw Materials | 10.1 | 10.1 | 10.1 | 9.1 | 9.1 |
| | Firing and Properties | | | | |
| Firing Temperature (° C.) | 1500 | 1500 | 1500 | 1500 | 1500 |
| Hold Time (hours) | 4 | 4 | 4 | 4 | 4 |
| CTE (RT-1000° C.) | 2.9 | 0.6 | 0.7 | 3.3 | 2.8 |
| % Porosity | 49.2 | 53.7 | 50.0 | 49.3 | 49.8 |
| $d_{50}$ | 11.0 | 12.6 | 12.4 | 9.1 | 9.4 |
| $d_{10}$ | 7.5 | 8.1 | 7.8 | 5.5 | 5.7 |
| $d_{90}$ | 16.2 | 20.1 | 27.0 | 25.2 | 19.8 |
| $(d_{50} - d_{10})/d_{50}$ | 0.32 | 0.36 | 0.37 | 0.39 | 0.40 |
| $(d_{90} - d_{10})/d_{50}$ | 0.79 | 0.96 | 1.55 | 2.16 | 1.51 |
| MOR rod (psi) | 694 | 630 | 780 | 753 | 728 |
| $Al_2TiO_5$ | M | M | M | M | M |
| Mullite | m | m | m | m | m |
| $Al_2O_3$ | s.tr | v.s.tr | v.s.tr | v.s.tr | v.s.tr |
| $TiO_2$ | v.s.tr | v.s.tr | v.s.tr | 0 | v.s.tr |

TABLE 10

| | Example Number | | | | | |
|---|---|---|---|---|---|---|
| | 33 | 34 | 35 | C11 | C12 | C13 |
| % $Al_2TiO_5$ | 80 | 80 | 80 | 80 | 80 | 80 |
| % Mullite | 20 | 20 | 20 | 20 | 20 | 20 |
| | Weight Percent | | | | | |
| $Y_2O_3$ | 5.00 | 2.00 | 1.00 | 0.50 | 0.20 | 0.10 |
| Alumina C | 41.48 | 41.48 | 41.48 | 41.48 | 41.48 | 41.48 |

TABLE 10-continued

| | Example Number | | | | | |
|---|---|---|---|---|---|---|
| | 33 | 34 | 35 | C11 | C12 | C13 |
| Aluminum hydroxide C | 20.00 | 20.00 | 20.00 | 20.00 | 20.00 | 20.00 |
| Titania A | 33.27 | 33.27 | 33.27 | 33.27 | 33.27 | 33.27 |
| Quartz B | 5.25 | 5.25 | 5.25 | 5.25 | 5.25 | 5.25 |
| Graphite A | 25.00 | 25.00 | 25.00 | 25.00 | 25.00 | 25.00 |
| MPS Alumina sources | 12.9 | 12.9 | 12.9 | 12.9 | 12.9 | 12.9 |
| MPS Titania source | 0.50 | 0.50 | 0.50 | 0.50 | 0.50 | 0.50 |
| MPS Quartz | 23.4 | 23.4 | 23.4 | 23.4 | 23.4 | 23.4 |
| MPS All Inorganic Raw Materials | 9.3 | 9.3 | 9.3 | 9.3 | 9.3 | 9.3 |
| Firing and Properties | | | | | | |
| Firing Temperature (° C.) | 1400 | 1400 | 1400 | 1400 | 1400 | 1400 |
| Hold Time (hours) | 4 | 4 | 4 | 4 | 4 | 4 |
| CTE(RT-1000° C.) | 6.0 | 5.7 | 9.2 | 14.9 | 21.9 | 35.5 |
| % Porosity | 44.7 | 48.0 | 52.2 | 51.4 | 47.6 | 49.3 |
| $d_{50}$ | 9.9 | 9.2 | 8.8 | 7.2 | 6.0 | 5.8 |
| $d_{10}$ | 7.3 | 5.9 | 5.6 | — | — | — |
| $d_{90}$ | 14.5 | 14.0 | 14.4 | — | — | — |
| $(d_{50} - d_{10})/d_{50}$ | 0.26 | 0.36 | 0.36 | — | — | — |
| $(d_{90} - d_{10})/d_{50}$ | 0.73 | 0.88 | 1.00 | — | — | — |
| MOR rod (psi) | 1213 | 1174 | 1450 | 916 | 1003 | 1048 |
| $Al_2TiO_5$ | — | — | — | — | — | — |
| Mullite | — | — | — | — | — | — |
| $Al_2O_3$ | — | — | — | — | — | — |
| $TiO_2$ | — | — | — | — | — | — |

TABLE 11

| | Example Number | | | | | |
|---|---|---|---|---|---|---|
| | C14 | 36 | 37 | 38 | 39 | C15 |
| % $Al_2TiO_5$ | 80 | 80 | 80 | 80 | 80 | 80 |
| % Mullite | 20 | 20 | 20 | 20 | 20 | 20 |
| Weight Percent | | | | | | |
| $Y_2O_3$ | 5.00 | 2.00 | 1.00 | 0.50 | 0.20 | 0.10 |
| Alumina C | 41.48 | 41.48 | 41.48 | 41.48 | 41.48 | 41.48 |
| Aluminum hydroxide C | 20.00 | 20.00 | 20.00 | 20.00 | 20.00 | 20.00 |
| Titania A | 33.27 | 33.27 | 33.27 | 33.27 | 33.27 | 33.27 |
| Quartz B | 5.25 | 5.25 | 5.25 | 5.25 | 5.25 | 5.25 |
| Graphite A | 25.00 | 25.00 | 25.00 | 25.00 | 25.00 | 25.00 |
| MPS Alumina sources | 12.9 | 12.9 | 12.9 | 12.9 | 12.9 | 12.9 |
| MPS Titania source | 0.50 | 0.50 | 0.50 | 0.50 | 0.50 | 0.50 |
| MPS Quartz | 23.4 | 23.4 | 23.4 | 23.4 | 23.4 | 23.4 |
| MPS All Inorganic Raw Materials | 9.3 | 9.3 | 9.3 | 9.3 | 9.3 | 9.3 |
| Firing and Properties | | | | | | |
| Firing Temperature (° C.) | 1500 | 1500 | 1500 | 1500 | 1500 | 1500 |
| Hold Time (hours) | 4 | 4 | 4 | 4 | 4 | 4 |
| CTE (RT-1000° C.) | −0.9 | −2.8 | −2.1 | 3.8 | 6.5 | 10.7 |
| % Porosity | 36.8 | 47.2 | 49.9 | 51.2 | 52.6 | 55.2 |
| $d_{50}$ | 13.5 | 10.6 | 10.1 | 9.1 | 8.0 | 7.7 |
| $d_{10}$ | — | 7.7 | 6.4 | 5.4 | 4.4 | — |
| $d_{90}$ | — | 14.6 | 15.3 | 12.8 | 11.4 | — |
| $(d_{50} - d_{10})/d_{50}$ | — | 0.27 | 0.37 | 0.41 | 0.45 | — |
| $(d_{90} - d_{10})/d_{50}$ | — | 0.65 | 0.88 | 0.81 | 0.88 | — |
| MOR rod (psi) | 942 | 751 | 819 | 808 | 831 | 909 |
| $Al_2TiO_5$ | — | — | — | — | — | — |
| Mullite | — | — | — | — | — | — |
| $Al_2O_3$ | — | — | — | — | — | — |
| $TiO_2$ | — | — | — | — | — | — |

TABLE 12

| | Example Number | | | | | | | | |
|---|---|---|---|---|---|---|---|---|---|
| | 40 | 41 | 42 | 43 | 44 | 45 | 46 | 47 | 48 |
| % Al$_2$TiO$_5$ | 70 | 70 | 70 | 70 | 70 | 70 | 70 | 70 | 70 |
| % Mullite | 30 | 30 | 30 | 30 | 30 | 30 | 30 | 30 | 30 |
| | Weight Percent | | | | | | | | |
| Y$_2$O$_3$ | 2.63 | — | — | — | — | — | — | — | — |
| CeO$_2$ | — | 3.84 | — | — | — | — | — | — | — |
| La$_2$O$_3$ | — | — | 3.42 | — | — | — | — | — | — |
| Nd$_2$O$_3$ | — | — | — | 3.81 | — | — | — | — | — |
| Pr$_6$O$_{11}$ | — | — | — | — | 3.63 | — | — | — | — |
| Sm$_2$O$_3$ | — | — | — | — | — | 3.89 | — | — | — |
| Gd$_2$O$_3$ | — | — | — | — | — | — | 3.90 | — | — |
| Dy$_2$O$_3$ | — | — | — | — | — | — | — | 4.10 | — |
| Calcined Bastnasite | — | — | — | — | — | — | — | — | 4.90 |
| Alumina C | 43.01 | 43.01 | 43.01 | 43.01 | 43.01 | 43.01 | 43.01 | 43.01 | 43.01 |
| Aluminum hydroxide C | 20.00 | 20.00 | 20.00 | 20.00 | 20.00 | 20.00 | 20.00 | 20.00 | 20.00 |
| Titania A | 29.12 | 29.12 | 29.12 | 29.12 | 29.12 | 29.12 | 29.12 | 29.12 | 29.12 |
| Quartz C | 7.87 | 7.87 | 7.87 | 7.87 | 7.87 | 7.87 | 7.87 | 7.87 | 7.87 |
| Graphite A | 25.00 | 25.00 | 25.00 | 25.00 | 25.00 | 25.00 | 25.00 | 25.00 | 25.00 |
| MPS Alumina sources | 12.8 | 12.8 | 12.8 | 12.8 | 12.8 | 12.8 | 12.8 | 12.8 | 12.8 |
| MPS Titania source | 0.50 | 0.50 | 0.50 | 0.50 | 0.50 | 0.50 | 0.50 | 0.50 | 0.50 |
| MPS Quartz | 25.4 | 25.4 | 25.4 | 25.4 | 25.4 | 25.4 | 25.4 | 25.4 | 25.4 |
| MPS Inorganic Raw Materials | 10.2 | 10.2 | 10.2 | 10.2 | 10.2 | 10.2 | 10.2 | 10.2 | 10.2 |
| | Firing and Properties | | | | | | | | |
| Firing Temperature (° C.) | 1400 | 1400 | 1400 | 1400 | 1400 | 1400 | 1400 | 1400 | 1400 |
| Hold Time (hours) | 4 | 4 | 4 | 4 | 4 | 4 | 4 | 4 | 4 |
| CTE (RT-1000° C.) | 5.7 | 8.2 | 11.9 | 6.1 | 6.4 | 8.9 | 11.0 | 7.4 | 11.4 |
| % Porosity | 47.7 | 39.6 | 42.1 | 39.9 | 40.5 | 43.2 | 44.4 | 48.4 | 45.1 |
| d$_{50}$ | 9.9 | 11.8 | 9.3 | 10.5 | 10.2 | 11.0 | 9.8 | 10.4 | 11.6 |
| d$_{10}$ | 6.6 | 8.6 | 6.3 | 7.6 | 7.2 | 7.8 | 6.4 | 7.0 | 8.5 |
| d$_{90}$ | 16.0 | 19.1 | 15.3 | 18.0 | 36.6 | 25.9 | 17.7 | 18.3 | 20.8 |
| (d$_{50}$ − d$_{10}$)/d$_{50}$ | 0.33 | 0.27 | 0.32 | 0.28 | 0.29 | 0.29 | 0.35 | 0.33 | 0.27 |
| (d$_{90}$ − d$_{10}$)/d$_{50}$ | 0.95 | 0.89 | 0.97 | 0.99 | 2.88 | 1.65 | 1.15 | 1.09 | 1.06 |
| MOR rod (psi) | 1055 | 1362 | 15.04 | 1299 | 1193 | 1270 | 1155 | 1015 | 1355 |
| Al$_2$TiO$_5$ | — | — | — | — | — | — | — | — | — |
| Mullite | — | — | — | — | — | — | — | — | — |
| Al$_2$O$_3$ | — | — | — | — | — | — | — | — | — |
| TiO$_2$ | — | — | — | — | — | — | — | — | — |

TABLE 13

| | Example Number | | | | | | | | |
|---|---|---|---|---|---|---|---|---|---|
| | 49 | 50 | 51 | 52 | 53 | 54 | 55 | 56 | 57 |
| % Al$_2$TiO$_5$ | 70 | 70 | 70 | 70 | 70 | 70 | 70 | 70 | 70 |
| % Mullite | 30 | 30 | 30 | 30 | 30 | 30 | 30 | 30 | 30 |
| | Weight Percent | | | | | | | | |
| Y$_2$O$_3$ | 2.63 | — | — | — | — | — | — | — | — |
| CeO$_2$ | — | 3.84 | — | — | — | — | — | — | — |
| La$_2$O$_3$ | — | — | 3.42 | — | — | — | — | — | — |
| Nd$_2$O$_3$ | — | — | — | 3.81 | — | — | — | — | — |
| Pr$_6$O$_{11}$ | — | — | — | — | 3.63 | — | — | — | — |
| Sm$_2$O$_3$ | — | — | — | — | — | 3.89 | — | — | — |
| Gd$_2$O$_3$ | — | — | — | — | — | — | 3.90 | — | — |
| Dy$_2$O$_3$ | — | — | — | — | — | — | — | 4.10 | — |
| Calcined Bastnasite | — | — | — | — | — | — | — | — | 4.90 |
| Alumina C | 43.01 | 43.01 | 43.01 | 43.01 | 43.01 | 43.01 | 43.01 | 43.01 | 43.01 |
| Aluminum hydroxide C | 20.00 | 20.00 | 20.00 | 20.00 | 20.00 | 20.00 | 20.00 | 20.00 | 20.00 |
| Titania A | 29.12 | 29.12 | 29.12 | 29.12 | 29.12 | 29.12 | 29.12 | 29.12 | 29.12 |
| Quartz C | 7.87 | 7.87 | 7.87 | 7.87 | 7.87 | 7.87 | 7.87 | 7.87 | 7.87 |
| Graphite A | 25.00 | 25.00 | 25.00 | 25.00 | 25.00 | 25.00 | 25.00 | 25.00 | 25.00 |
| MPS Alumina sources | 12.8 | 12.8 | 12.8 | 12.8 | 12.8 | 12.8 | 12.8 | 12.8 | 12.8 |
| MPS Titania source | 0.50 | 0.50 | 0.50 | 0.50 | 0.50 | 0.50 | 0.50 | 0.50 | 0.50 |
| MPS Quartz | 25.4 | 25.4 | 25.4 | 25.4 | 25.4 | 25.4 | 25.4 | 25.4 | 25.4 |
| MPS Inorganic Raw Materials | 10.2 | 10.2 | 10.2 | 10.2 | 10.2 | 10.2 | 10.2 | 10.2 | 10.2 |

TABLE 13-continued

| | Example Number | | | | | | | | |
|---|---|---|---|---|---|---|---|---|---|
| | 49 | 50 | 51 | 52 | 53 | 54 | 55 | 56 | 57 |
| Firing and Properties | | | | | | | | | |
| Firing Temperature (° C.) | 1500 | 1500 | 1500 | 1500 | 1500 | 1500 | 1500 | 1500 | 1500 |
| Hold Time (hours) | 4 | 4 | 4 | 4 | 4 | 4 | 4 | 4 | 4 |
| CTE (RT-1000° C.) | −0.9 | 1.0 | 4.6 | 3.5 | 2.7 | 1.5 | 1.0 | 0.0 | 4.3 |
| % Porosity | 43.7 | 41.4 | 42.9 | 40.2 | 38.7 | 42.4 | 44.0 | 44.9 | 44.2 |
| $d_{50}$ | 12.0 | 13.2 | 10.8 | 12.2 | 12.3 | 12.9 | 11.9 | 12.3 | 13.7 |
| $d_{10}$ | 8.9 | 9.7 | 7.9 | 9.2 | 9.5 | 9.9 | 8.9 | 9.1 | 10.6 |
| $d_{90}$ | 19.6 | 23.0 | 19.5 | 19.2 | 19.6 | 19.6 | 20.0 | 21.6 | 40.4 |
| $(d_{50} - d_{10})/d_{50}$ | 0.26 | 0.27 | 0.27 | 0.25 | 0.23 | 0.23 | 0.25 | 0.26 | 0.23 |
| $(d_{90} - d_{10})/d_{50}$ | 0.89 | 1.01 | 1.07 | 0.82 | 0.82 | 0.75 | 0.93 | 1.02 | 2.18 |
| MOR rod (psi) | 931 | 1106 | 1188 | 1218 | 1208 | 1095 | 1011 | 940 | 1011 |
| $Al_2TiO_5$ | — | — | — | — | — | — | — | — | — |
| Mullite | — | — | — | — | — | — | — | — | — |
| $Al_2O_3$ | — | — | — | — | — | — | — | — | — |
| $TiO_2$ | — | — | — | — | — | — | — | — | — |

TABLE 14

| | Example Number | | | | |
|---|---|---|---|---|---|
| | 58 | 59 | C16 | C17 | C18 |
| % $Al_2TiO_5$ | 80 | 80 | 80 | 80 | 80 |
| % Mullite | 20 | 20 | 20 | 20 | 20 |
| Weight Percent | | | | | |
| $Y_2O_3$ | 2.78 | — | — | — | — |
| $CaCO_3$ | — | 1.88 | — | — | — |
| $SrCO_3$ | — | — | 2.61 | — | — |
| $In_2O_3$ | — | — | — | 3.88 | — |
| $SnO_2$ | — | — | — | — | 3.86 |
| Alumina C | 41.48 | 41.48 | 41.48 | 41.48 | 41.48 |
| Aluminum hydroxide C | 20.00 | 20.00 | 20.00 | 20.00 | 20.00 |
| Titania A | 33.27 | 33.27 | 33.27 | 33.27 | 33.27 |
| Quartz B | 5.25 | 5.25 | 5.25 | 5.25 | 5.25 |
| Quartz C | — | — | — | — | — |
| Graphite A | 25.00 | 25.00 | 25.00 | 25.00 | 25.00 |
| MPS Alumina sources | 12.9 | 12.9 | 12.9 | 12.9 | 12.9 |
| MPS Titania source | 0.50 | 0.50 | 0.50 | 0.50 | 0.50 |
| MPS Quartz | 23.4 | 23.4 | 23.4 | 23.4 | 23.4 |
| MPS All Inorganic Raw Materials | 9.3 | 9.3 | 9.3 | 9.3 | 9.3 |
| Firing and Properties | | | | | |
| Firing Temperature (° C.) | 1400 | 1400 | 1400 | 1400 | 1400 |
| Hold Time (hours) | 4 | 4 | 4 | 4 | 4 |
| CTE (RT-1000° C.) | 5.3 | 14.0 | 30.0 | 45.3 | 63.4 |
| % Porosity | 47.7 | 49.8 | 48.7 | 52.7 | 48.1 |
| $d_{50}$ | 9.4 | 10.4 | 7.6 | 6.1 | 4.2 |
| $d_{10}$ | 5.9 | 6.8 | — | — | — |
| $d_{90}$ | 12.4 | 19.4 | — | — | — |
| $(d_{50} - d_{10})/d_{50}$ | 0.37 | 0.35 | — | — | — |
| $(d_{90} - d_{10})/d_{50}$ | 0.69 | 1.21 | — | — | — |
| MOR rod (psi) | 904 | 1207 | 1266 | 877 | 1778 |
| $Al_2TiO_5$ | M | M | M | M | M |
| Mullite | m | 0 | 0 | m | m |
| $Al_2O_3$ | tr | m | m | m | M |
| $TiO_2$ | tr | m | m | M | M |

TABLE 15

| | Example Number | | | | |
|---|---|---|---|---|---|
| | 60 | 61 | C19 | C20 | C21 |
| % $Al_2TiO_5$ | 80 | 80 | 80 | 80 | 80 |
| % Mullite | 20 | 20 | 20 | 20 | 20 |
| Weight Percent | | | | | |
| $Y_2O_3$ | 2.78 | — | — | — | — |
| $CaCO_3$ | — | 1.88 | — | — | — |
| $SrCO_3$ | — | — | 2.61 | — | — |
| $In_2O_3$ | — | — | — | 3.88 | — |
| $SnO_2$ | — | — | — | — | 3.86 |
| Alumina C | 41.48 | 41.48 | 41.48 | 41.48 | 41.48 |
| Aluminum hydroxide C | 20.00 | 20.00 | 20.00 | 20.00 | 20.00 |
| Titania A | 33.27 | 33.27 | 33.27 | 33.27 | 33.27 |
| Quartz B | 5.25 | 5.25 | 5.25 | 5.25 | 5.25 |
| Graphite A | 25.00 | 25.00 | 25.00 | 25.00 | 25.00 |
| MPS Alumina sources | 12.9 | 12.9 | 12.9 | 12.9 | 12.9 |
| MPS Titania source | 0.50 | 0.50 | 0.50 | 0.50 | 0.50 |
| MPS Quartz | 23.4 | 23.4 | 23.4 | 23.4 | 23.4 |
| MPS All Inorganic Raw Materials | 9.3 | 9.3 | 9.3 | 9.3 | 9.3 |
| Firing and Properties | | | | | |
| Firing Temperature (° C.) | 1500 | 1500 | 1500 | 1500 | 1500 |
| Hold Time (hours) | 4 | 4 | 4 | 4 | 4 |
| CTE (RT-1000° C.) | −1.6 | 11.3 | 16.9 | 12.1 | 28.6 |
| % Porosity | 44.9 | 44.0 | 49.5 | 53.7 | 54.8 |
| $d_{50}$ | 11.4 | 10.4 | 10.5 | 11.6 | 6.9 |
| $d_{10}$ | 8.6 | 7.8 | — | — | — |
| $d_{90}$ | 15.2 | 28.6 | — | — | — |
| $(d_{50} - d_{10})/d_{50}$ | 0.25 | 0.25 | — | — | — |
| $(d_{90} - d_{10})/d_{50}$ | 0.58 | 2.00 | — | — | — |
| MOR rod (psi) | 823 | 873 | 828 | 480 | 765 |
| $Al_2TiO_5$ | M | M | M | M | M |
| Mullite | m | tr | 0 | m | m |
| $Al_2O_3$ | tr | m | m | v.s.tr | tr |
| $TiO_2$ | v.s.tr | tr | m | tr | tr |

TABLE 16

| | Example Number | | | | | | |
|---|---|---|---|---|---|---|---|
| | C22 | C23 | C24 | C25 | C26 | C27 | C28 |
| % $Al_2TiO_5$ | 80 | 80 | 80 | 80 | 80 | 80 | 80 |
| % Mullite | 20 | 20 | 20 | 20 | 20 | 20 | 20 |
| | Weight Percent | | | | | | |
| $Bi_2O_3$ | 4.75 | — | — | — | — | — | — |
| $MoO_3$ | — | 2.61 | — | — | — | — | — |
| $B_2O_3$ | — | — | 1.37 | — | — | — | — |
| $Nb_2O_5$ | — | — | — | 2.48 | — | — | — |
| $WO_3$ | — | — | — | — | 3.98 | — | — |
| ZnO | — | — | — | — | — | 3.11 | — |
| $ZrO_2$ | — | — | — | — | — | — | 3.11 |
| Alumina A | 53.52 | 53.52 | 53.52 | 53.52 | 53.52 | 53.52 | 53.52 |
| Titania A | 34.56 | 34.56 | 34.56 | 34.56 | 34.56 | 34.56 | 34.56 |
| Kaolin A | 11.92 | 11.92 | 11.92 | 11.92 | 11.92 | 11.92 | 11.92 |
| Graphite A | 25.00 | 25.00 | 25.00 | 25.00 | 25.00 | 25.00 | 25.00 |
| MPS Alumina sources | 6.8 | 6.8 | 6.8 | 6.8 | 6.8 | 6.8 | 6.8 |
| MPS Titania source | 0.50 | 0.50 | 0.50 | 0.50 | 0.50 | 0.50 | 0.50 |
| MPS Quartz | — | — | — | — | — | — | — |
| MPS All Inorganic Raw Materials | 5.0 | 5.0 | 5.0 | 5.0 | 5.0 | 5.0 | 5.0 |
| | Firing and Properties | | | | | | |
| Firing Temperature (° C.) | 1400 | 1400 | 1400 | 1400 | 1400 | 1400 | 1400 |
| Hold Time (hours) | 4 | 4 | 4 | 4 | 4 | 4 | 4 |
| CTE (RT-1000° C.) | 37.1 | 26.4 | 36.5 | 41.4 | 50.6 | 36.5 | 43.7 |
| % Porosity | 49.1 | 52.3 | 51.8 | 51.0 | 53.8 | 47.9 | 50.2 |
| $d_{50}$ | 5.2 | 4.5 | 4.1 | 2.8 | 2.8 | 3.7 | 3.0 |
| $d_{10}$ | — | — | — | — | — | — | — |
| $d_{90}$ | — | — | — | — | — | — | — |
| $(d_{50} - d_{10})/d_{50}$ | — | — | — | — | — | — | — |
| $(d_{50} - d_{10})/d_{50}$ | — | — | — | — | — | — | — |
| MOR rod (psi) | 1416 | 1164 | 1599 | 2165 | 1817 | 1827 | 2094 |
| $Al_2TiO_5$ | M | M | M | M | M | M | M |
| Mullite | m | m | m | m | m | m | m |
| $Al_2O_3$ | m | tr | tr | M | M | 0 | tr |
| $TiO_2$ | m | tr | m | M | M | tr | 0 |

TABLE 17

| | Example Number | | | | | | |
|---|---|---|---|---|---|---|---|
| | C29 | C30 | C31 | C32 | C33 | C34 | C35 |
| % $Al_2TiO_5$ | 80 | 80 | 80 | 80 | 80 | 80 | 80 |
| % Mullite | 20 | 20 | 20 | 20 | 20 | 20 | 20 |
| | Weight Percent | | | | | | |
| $Bi_2O_3$ | 4.75 | — | — | — | — | — | — |
| $MoO_3$ | — | 2.61 | — | — | — | — | — |
| $B_2O_3$ | — | — | 1.37 | — | — | — | — |
| $Nb_2O_5$ | — | — | — | 2.48 | — | — | — |
| $WO_3$ | — | — | — | — | 3.98 | — | — |
| ZnO | — | — | — | — | — | 3.11 | — |
| $ZrO_2$ | — | — | — | — | — | — | 3.11 |
| Alumina A | 53.52 | 53.52 | 53.52 | 53.52 | 53.52 | 53.52 | 53.52 |
| Titania A | 34.56 | 34.56 | 34.56 | 34.56 | 34.56 | 34.56 | 34.56 |
| Kaolin A | 11.92 | 11.92 | 11.92 | 11.92 | 11.92 | 11.92 | 11.92 |
| Graphite A | 25.00 | 25.00 | 25.00 | 25.00 | 25.00 | 25.00 | 25.00 |
| MPS Alumina sources | 6.8 | 6.8 | 6.8 | 6.8 | 6.8 | 6.8 | 6.8 |
| MPS Titania source | 0.50 | 0.50 | 0.50 | 0.50 | 0.50 | 0.50 | 0.50 |
| MPS Quartz | — | — | — | — | — | — | — |
| MPS All Inorganic Raw Materials | 5.0 | 5.0 | 5.0 | 5.0 | 5.0 | 5.0 | 5.0 |
| | Firing and Properties | | | | | | |
| Firing Temperature (° C.) | 1500 | 1500 | 1500 | 1500 | 1500 | 1500 | 1500 |
| Hold Time (hours) | 4 | 4 | 4 | 4 | 4 | 4 | 4 |
| CTE (RT-1000° C.) | 9.0 | 16.5 | 30.3 | 26.2 | 24.8 | 24.7 | 20.0 |
| % Porosity | 41.9 | 55.1 | 51.8 | 48.6 | 51.4 | 46.7 | 50.7 |
| $d_{50}$ | 5.1 | 4.0 | 4.1 | 5.0 | 5.2 | 4.3 | 4.9 |
| $d_{10}$ | — | — | — | — | — | — | — |
| $d_{90}$ | — | — | — | — | — | — | — |
| $(d_{50} - d_{10})/d_{50}$ | — | — | — | — | — | — | — |
| $(d_{90} - d_{10})/d_{50}$ | — | — | — | — | — | — | — |

TABLE 17-continued

| | C29 | C30 | C31 | C32 | C33 | C34 | C35 |
|---|---|---|---|---|---|---|---|
| MOR rod (psi) | 966 | 881 | 1120 | 1131 | 959 | 1343 | 1027 |
| $Al_2TiO_5$ | M | M | M | M | M | M | M |
| Mullite | m | m | m | m | m | m | m |
| $Al_2O_3$ | tr | tr | v.s.tr | 0 | tr | 0 | 0 |
| $TiO_2$ | tr | tr | v.s.tr | tr | m | 0 | 0 |

TABLE 18

Example Number

| | 63 | 64 | 65 | 66 | 67 | 68 | 69 | 70 |
|---|---|---|---|---|---|---|---|---|
| % $Al_2TiO_5$ | 70 | 70 | 70 | 70 | 70 | 70 | 70 | 70 |
| % Mullite | 30 | 30 | 30 | 30 | 30 | 30 | 30 | 30 |
| Weight Percent | | | | | | | | |
| $Y_2O_3$ | 2.63 | 2.63 | 2.63 | 2.63 | 2.63 | 2.63 | 2.63 | 2.63 |
| Alumina A | — | — | — | — | — | — | — | — |
| Alumina B | 43.01 | — | — | — | 43.01 | — | — | — |
| Alumina C | — | 43.01 | — | — | — | 43.01 | — | — |
| Alumina D | — | — | 43.01 | — | — | — | 43.01 | — |
| Alumina E | — | — | — | 43.01 | — | — | — | 43.01 |
| Aluminum hydroxide C | 20.00 | 20.00 | 20.00 | 20.00 | 20.00 | 20.00 | 20.00 | 20.00 |
| Titania A | 29.12 | 29.12 | 29.12 | 29.12 | 29.12 | 29.12 | 29.12 | 29.12 |
| Quartz C | 7.87 | 7.87 | 7.87 | 7.87 | 7.87 | 7.87 | 7.87 | 7.87 |
| Graphite A | 25.00 | 25.00 | 25.00 | 25.00 | 25.00 | 25.00 | 25.00 | 25.00 |
| MPS Alumina sources | 12.8 | 12.8 | 22.9 | 35.2 | 12.8 | 12.8 | 22.9 | 35.2 |
| MPS Titania source | 0.50 | 0.50 | 0.50 | 0.50 | 0.50 | 0.50 | 0.50 | 0.50 |
| MPS Quartz | 25.4 | 25.4 | 25.4 | 25.4 | 25.4 | 25.4 | 25.4 | 25.4 |
| MPS Inorganic Raw Materials | 10.2 | 10.2 | 16.6 | 24.3 | 10.2 | 10.2 | 16.6 | 24.3 |
| Firing and Properties | | | | | | | | |
| Firing Temperature (° C.) | 1400 | 1400 | 1400 | 1400 | 1500 | 1500 | 1500 | 1500 |
| Hold Time (hours) | 4 | 4 | 4 | 4 | 4 | 4 | 4 | 4 |
| CTE (RT-1000° C.) | 10.4 | 9.8 | 7.5 | 6.1 | 1.4 | 2.8 | -0.7 | -3.8 |
| % Porosity | 44.7 | 50.3 | 48.2 | 50.0 | 41.6 | 45.2 | 47.8 | 48.4 |
| $d_{50}$ | 8.7 | 10.0 | 13.7 | 17.6 | 9.8 | 11.4 | 15.1 | 21.4 |
| $d_{10}$ | 5.8 | 6.5 | 9.5 | 12.8 | 7.3 | 8.3 | 10.6 | 15.0 |
| $d_{90}$ | 12.4 | 15.5 | 20.1 | 26.5 | 13.7 | 20.2 | 26.9 | 31.2 |
| $(d_{50} - d_{10})/d_{50}$ | 0.33 | 0.35 | 0.31 | 0.27 | 0.25 | 0.27 | 0.30 | 0.30 |
| $(d_{90} - d_{10})/d_{50}$ | 0.76 | 0.90 | 0.78 | 0.78 | 0.65 | 1.05 | 1.08 | 0.75 |
| MOR rod (psi) | 1439 | 1174 | 959 | 710 | 1175 | 1017 | 753 | 505 |
| $Al_2TiO_5$ | — | — | — | — | — | — | — | — |
| Mullite | — | — | — | — | — | — | — | — |
| $Al_2O_3$ | — | — | — | — | — | — | — | — |
| $TiO_2$ | — | — | — | — | — | — | — | — |

TABLE 19

Example Number

| | 71 | 72 | 73 | 74 | 75 |
|---|---|---|---|---|---|
| % $Al_2TiO_5$ | 70 | 70 | 70 | 70 | 70 |
| % Mullite | 30 | 30 | 30 | 30 | 30 |
| Weight Percent | | | | | |
| $Y_2O_3$ | 2.50 | 2.50 | 2.63 | 2.63 | 2.50 |
| Alumina C | — | — | 43.01 | 43.01 | 43.01 |
| Alumina E | 43.01 | 43.01 | — | — | — |
| Aluminum hydroxide C | 20.00 | 20.00 | 20.00 | 20.00 | 20.00 |
| Titania A | 29.12 | 29.12 | — | — | — |
| Titania B | — | — | 29.12 | 29.12 | — |
| Titania C | — | — | — | — | 31.83 |
| Quartz C | 7.87 | 7.87 | 7.87 | 7.87 | 7.87 |
| Graphite A | 25.00 | 25.00 | 25.00 | 25.00 | 25.00 |
| MPS Alumina sources | 35.2 | 35.2 | 12.8 | 12.8 | 12.8 |
| MPS Titania source | 0.50 | 0.50 | 13.69 | 13.69 | 22.68 |
| MPS Quartz | 25.4 | 25.4 | 25.4 | 25.4 | 25.4 |
| MPS All Inorganic Raw Materials | 24.3 | 24.3 | 14.1 | 14.1 | 16.8 |
| Firing and Properties | | | | | |
| Firing Temperature (° C.) | 1450 | 1450 | 1400 | 1500 | 1450 |
| Hold Time (hours) | 6 | 8 | 4 | 4 | 6 |
| CTE (RT-1000° C.) | 0.8 | -2.7 | 12.5 | 5.1 | 6.3 |
| % Porosity | 48.4 | 49.0 | 56.9 | 53.9 | 58.0 |

TABLE 19-continued

| | Example Number | | | | |
|---|---|---|---|---|---|
| | 71 | 72 | 73 | 74 | 75 |
| $d_{50}$ | 18.1 | 18.8 | 13.3 | 15.5 | 12.4 |
| $d_{10}$ | 12.2 | 12.7 | 9.8 | 11.8 | 10.2 |
| $d_{90}$ | 26.4 | 30.8 | 17.6 | 19.7 | 22.3 |
| $(d_{50} - d_{10})/d_{50}$ | 0.33 | 0.32 | 0.26 | 0.24 | 0.18 |
| $(d_{90} - d_{10})/d_{50}$ | 0.78 | 0.97 | 0.59 | 0.51 | 0.97 |
| MOR rod (psi) | — | — | 646 | 520 | — |
| Diameter (cm) | — | 14.46 | — | — | — |
| Height (cm) | — | 15.29 | — | — | — |
| Cells per square inch | — | 311 | — | — | — |
| Wall Thickness ($10^{-3}$ in) | — | 11.2 | — | — | — |
| Mass (g) | — | 1713 | — | — | — |
| Approx. Filter Bulk Density (g/cm$^3$) | — | 0.681 | — | — | — |
| Pressure drop at 0 g/L, 210 scfm (kPa) | — | 1.54 | — | — | — |
| Pressure drop at 5 g/L, 210 scfm (kPa) | — | 3.87 | — | — | — |

TABLE 20

| | Example Number | | | | | |
|---|---|---|---|---|---|---|
| | 76 | 77 | 78 | 79 | 80 | 81 |
| % $Al_2TiO_5$ | 80 | 80 | 80 | 80 | 80 | 80 |
| % Mullite | 20 | 20 | 20 | 20 | 20 | 20 |
| Weight Percent | | | | | | |
| $MoO_3$ | 2.00 | 2.00 | 2.00 | 2.00 | 2.00 | 2.00 |
| $Y_2O_3$ | 2.00 | 2.00 | 2.00 | 2.00 | 2.00 | 2.00 |
| Alumina C | 41.48 | 41.48 | 41.48 | 41.48 | 41.48 | 41.48 |
| Aluminum hydroxide A | 20.00 | 20.00 | 20.00 | 20.00 | 20.00 | 20.00 |
| Titania A | 33.27 | 33.27 | 33.27 | 33.27 | 33.27 | 33.27 |
| Quartz A | 5.25 | 5.25 | 5.25 | 5.25 | 5.25 | 5.25 |
| Graphite A | 25.00 | 25.00 | 25.00 | 25.00 | 25.00 | 25.00 |
| MPS Alumina sources | 9.8 | 9.8 | 9.8 | 9.8 | 9.8 | 9.8 |
| MPS Titania source | 0.5 | 0.5 | 0.5 | 0.5 | 0.5 | 0.5 |
| MPS Quartz | 3.7 | 3.7 | 3.7 | 3.7 | 3.7 | 3.7 |
| MPS All Inorganic Raw Materials | 6.4 | 6.4 | 6.4 | 6.4 | 6.4 | 6.4 |
| Firing and Properties | | | | | | |
| Firing Temperature (° C.) | 1415 | 1435 | 1435 | 1435 | 1455 | 1475 |
| Hold Time (hours) | 8 | 6 | 6 | 6 | 6 | 6 |
| Kiln Type (E = electric, G = gas) | E | G | E | G | G | E |
| CTE (RT-1000° C.) | -2.3 | -3.6 | -4.1 | 1.1 | -0.2 | -6.1 |
| % Porosity | 50.5 | 48.7 | 49.3 | 51.1 | 50.0 | 47.7 |
| $d_{50}$ | 10.0 | 9.2 | 9.7 | 9.7 | 9.9 | 10.4 |
| $d_{10}$ | — | 6.1 | 6.4 | 6.3 | 7.1 | 7.4 |
| $d_{90}$ | — | 12.8 | 13.7 | 13.6 | 13.7 | 14.1 |
| $(d_{50} - d_{10})/d_{50}$ | — | 0.33 | 0.34 | 0.35 | 0.29 | 0.29 |
| $(d_{90} - d_{10})/d_{50}$ | — | 0.72 | 0.76 | 0.75 | 0.67 | 0.65 |
| Diameter (cm) | — | — | 4.95 | — | — | — |
| Height (cm) | — | — | 15.24 | — | — | — |
| Cells per square inch | — | — | 191 | — | — | — |
| Wall Thickness ($10^{-3}$ in) | — | — | 14.0 | — | — | — |
| Mass (g) | — | — | 211.8 | — | — | — |
| Approx. Filter Bulk Density (g/cm$^3$) | — | — | 0.721 | — | — | — |
| Pressure drop at 0 g/L, 26.25 scfm (kPa) | — | — | 1.87 | — | — | — |
| Pressure drop at 5 g/L, 26.25 scfm (kPa) | — | — | 4.51 | — | — | — |

TABLE 21

| | Example Number | | | | | | |
|---|---|---|---|---|---|---|---|
| | 82 | 83 | 84 | 85 | 86 | 87 | 88 |
| % Al$_2$TiO$_5$ | 80 | 80 | 80 | 80 | 80 | 80 | 80 |
| % Mullite | 20 | 20 | 20 | 20 | 20 | 20 | 20 |
| Weight Percent | | | | | | | |
| Y$_2$O$_3$ | 2.00 | 2.00 | 2.00 | 2.00 | 2.00 | 2.00 | 2.00 |
| Alumina C | 41.48 | 41.48 | 41.48 | 41.48 | 41.48 | 41.48 | 41.48 |
| Aluminum hydroxide A | 20.00 | 20.00 | 20.00 | 20.00 | 20.00 | 20.00 | 20.00 |
| Titania A | 33.27 | 33.27 | 33.27 | 33.27 | 33.27 | 33.27 | 33.27 |
| Quartz A | 5.25 | 5.25 | 5.25 | 5.25 | 5.25 | 5.25 | 5.25 |
| Graphite A | 25.00 | 25.00 | 25.00 | 25.00 | 25.00 | 25.00 | 25.00 |
| MPS Alumina sources | 9.8 | 9.8 | 9.8 | 9.8 | 9.8 | 9.8 | 9.8 |
| MPS Titania source | 0.5 | 0.5 | 0.5 | 0.5 | 0.5 | 0.5 | 0.5 |
| MPS Quartz | 3.7 | 3.7 | 3.7 | 3.7 | 3.7 | 3.7 | 3.7 |
| MPS All Inorganic Raw Materials | 6.4 | 6.4 | 6.4 | 6.4 | 6.4 | 6.4 | 6.4 |
| Firing and Properties | | | | | | | |
| Firing Temperature (° C.) | 1415 | 1435 | 1455 | 1465 | 1475 | 1475 | 1435 |
| Hold Time (hours) | 8 | 6 | 6 | 4 | 6 | 6 | 6 |
| Kiln Type (E = electric, G = gas) | E | G | G | E | E | G | E |
| CTE (RT-1000° C.) | −0.5 | −3.5 | 0.7 | −5.1 | −4.3 | −0.3 | — |
| % Porosity | 48.3 | 48.7 | 48.5 | 46.5 | 46.9 | 49.9 | — |
| d$_{50}$ | 9.7 | 9.5 | 10.5 | 10.2 | 10.5 | 10.7 | — |
| d$_{10}$ | — | 6.4 | 7.4 | — | 7.4 | 7.8 | — |
| d$_{90}$ | — | 13.1 | 14.7 | — | 15.0 | 14.8 | — |
| (d$_{50}$ − d$_{10}$)/d$_{50}$ | — | 0.33 | 0.30 | — | 0.29 | 0.28 | — |
| (d$_{90}$ − d$_{10}$)/d$_{50}$ | — | 0.71 | 0.70 | — | 0.72 | 0.66 | — |
| Diameter (cm) | — | — | — | 4.83 | — | — | 4.89 |
| Height (cm) | — | — | — | 15.30 | — | — | 15.24 |
| Cells per square inch | — | — | — | 208 | — | — | 203 |
| Wall Thickness (10$^{-3}$ in) | — | — | — | 13.6 | — | — | 12.7 |
| Mass (g) | — | — | — | 214.9 | — | — | 207.2 |
| Approx. Filter Bulk Density (g/cm$^3$) | — | — | — | 0.767 | — | — | 0.724 |
| Pressure drop at 0 g/L, 26.25 scfm (kPa) | — | — | — | 2.02 | — | — | 1.94 |
| Pressure drop at 5 g/L, 26.25 scfm (kPa) | — | — | — | 5.48 | — | — | 4.86 |

TABLE 22

| | Example Number | | | | |
|---|---|---|---|---|---|
| | 89 | 90 | 91 | 92 | 93 |
| % Al$_2$TiO$_5$ | 70 | 70 | 70 | 70 | 70 |
| % Mullite | 30 | 30 | 30 | 30 | 30 |
| Weight Percent | | | | | |
| Y$_2$O$_3$ | 2.00 | 2.00 | 2.00 | 2.00 | 2.00 |
| Alumina C | 43.01 | 43.01 | 43.01 | 43.01 | 43.01 |
| Aluminum hydroxide C | 20.00 | 20.00 | 20.00 | 20.00 | 20.00 |
| Titania A | 29.12 | 29.12 | 29.12 | 29.12 | 29.12 |
| Quartz C | 7.87 | 7.87 | 7.87 | 7.87 | 7.87 |
| Graphite A | 25.00 | 25.00 | 25.00 | 25.00 | 25.00 |
| MPS Alumina sources | 12.8 | 12.8 | 12.8 | 12.8 | 12.8 |
| MPS Titania source | 0.5 | 0.5 | 0.5 | 0.5 | 0.5 |
| MPS Quartz | 25.4 | 25.4 | 25.4 | 25.4 | 25.4 |
| MPS All Inorganic Raw Materials | 10.2 | 10.2 | 10.2 | 10.2 | 10.2 |
| Firing and Properties | | | | | |
| Firing Temperature (° C.) | 1415 | 1435 | 1435 | 1455 | 1475 |
| Hold Time (hours) | 8 | 6 | 6 | 6 | 6 |
| Kiln Type (E = electric, G = gas) | E | G | E | G | E |
| CTE (RT-1000° C.) | 6.5 | 4.1 | 5.1 | 3.9 | 3.6 |
| % Porosity | 47.8 | 51.8 | 49.3 | 50.5 | 48.4 |
| d$_{50}$ | 10.5 | 10.4 | 10.4 | 10.7 | 11.5 |
| d$_{10}$ | — | 6.6 | 6.9 | — | 7.6 |
| d$_{90}$ | — | 15.8 | 17.0 | — | 16.8 |
| (d$_{50}$ − d$_{10}$)/d$_{50}$ | — | 0.36 | 0.34 | — | 0.34 |
| (d$_{90}$ − d$_{10}$)/d$_{50}$ | — | 0.88 | 0.97 | — | 0.80 |
| Diameter (cm) | — | — | 4.91 | 4.96 | — |
| Height (cm) | — | — | 15.24 | 15.34 | — |
| Cells per square inch | — | — | 202 | 194 | — |

TABLE 22-continued

| | Example Number | | | | |
|---|---|---|---|---|---|
| | 89 | 90 | 91 | 92 | 93 |
| Wall Thickness ($10^{-3}$ in) | — | — | 13.6 | 14.1 | — |
| Mass (g) | — | — | 207.1 | 205.4 | — |
| Approx. Filter Bulk Density (g/cm³) | — | — | 0.716 | 0.693 | — |
| Pressure drop at 0 g/L, 26.25 scfm (kPa) | — | — | 1.89 | 1.73 | — |
| Pressure drop at 5 g/L, 26.25 scfm (kPa) | — | — | 5.02 | 4.88 | — |

TABLE 23

| | Example Number 94 |
|---|---|
| % $Al_2TiO_5$ | 80 |
| % Mullite | 20 |
| Weight Percent | |
| $Y_2O_3$ | 2.00 |
| Alumina B | 41.48 |
| Aluminum hydroxide C | 20.00 |
| Titania A | 33.27 |
| Quartz B | 5.25 |
| Graphite A | 25 |
| MPS Alumina sources | 12.9 |
| MPS Titania source | 0.50 |
| MPS Quartz | 23.4 |
| MPS All Inorganic Raw Materials | 9.3 |
| Firing and Properties | |
| Firing Temperature (° C.) | 1425 |
| Hold Time (hours) | 10 |
| % Porosity | 48.8 |
| $d_{50}$ | 10.2 |

| | Pre-Cycled | Post-Cycled |
|---|---|---|
| % Length Change | — | +0.21% |
| CTE(RT-1000° C.) on rod | −2.2 | −3.6 |
| MOR rod (psi) | 825 | 815 |

What is claimed:

1. A ceramic body, comprising:
a phase of aluminum titanate and a narrow pore size distribution as characterized by the relation $(d_{50}-d_{10})/d_{50}$ being less than 0.50,
a coefficient of thermal expansion (RT-1000° C.) Less than $15\times10^{-7}$ $C^{-1}$,
a porosity of at least 38% by volume, and
at least 0.10% by weight of a metal oxide for a metal selected from the group consisting of bismuth, calcium, yttrium, lanthanides and combinations thereof.

2. The ceramic body of claim 1 further comprising $(d_{50}-d_{10})/d_{50}$ being less than 0.35.

3. The ceramic body of claim 1 further comprising $(d_{50}-d_{10})/d_{50}$ being less than 0.25.

4. The ceramic body of claim 1 further comprising $(d_{50}-d_{10})/d_{50}$ being 0.23 or less.

5. The ceramic body of claim 1 wherein the relation $(d_{50}-d_{10})/d_{50}$ is less than 0.50 and greater than 0.18.

6. The ceramic body of claim 1 further comprising a phase of mullite.

7. The ceramic body of claim 1 further exhibiting a coefficient of thermal expansion (RT-1000° C.) not greater than $10\times10^{-7}$ $C^{-1}$.

8. The ceramic body of claim 1 further exhibiting a porosity of between 45-60% by volume.

9. The ceramic body of claim 1 further exhibiting a median pore diameter of at least 8 microns.

10. The ceramic body of claim 9 further exhibiting a median pore diameter of between 10-20 microns.

11. The ceramic body of claim 1 further exhibiting a modulus of rupture (MOR) using the four point method on a cylindrical rod, of at least 450 psi.

12. The ceramic body of claim 1 further exhibiting modulus of rupture (MOR) using the four point method on a cylindrical rod, of at least 500 psi.

13. The ceramic body of claim 1 further exhibiting modulus of rupture (MOR) using the four point method on a cylindrical rod, of at least 600 psi.

14. The ceramic body of claim 1 further exhibiting modulus of rupture (MOR) using the four point method on a cylindrical rod, of at least 700 psi.

15. The ceramic body of claim 1 further exhibiting a set of properties including a coefficient of thermal expansion (RT-1000° C.) less than $10\times10^{-7}$ $C^{-1}$, a porosity of between 45-60% by volume, and a median pore diameter of between 10-20 microns.

16. The ceramic body of claim 15 further comprising a narrow pore size distribution as characterized by the relation $(d_{50}-d_{10})/d_{50}$ being less than 0.25.

17. The ceramic body of claim 1 wherein the ceramic body exhibits said set of properties when sintered to a temperature of between 1375° C. to 1550° C.

18. The ceramic body of claim 1 further comprising between 0.10% to 5.0% by weight of the metal oxide.

19. A diesel exhaust particulate filter comprising the ceramic body of claim 1 wherein the ceramic body is a plugged, wall-flow honeycomb body having a plurality of parallel end-plugged cell channels traversing the body from a frontal inlet end to an outlet end thereof.

20. The diesel exhaust particulate filter of claim 19 further exhibiting a coefficient of thermal expansion (RT-1000° C.) less than $10\times10^{-7}$ $C^{-1}$, a porosity of between 45-60% by volume, a median pore diameter of between 10-20 microns, and a narrow pore size distribution as characterized by the relation $(d_{50}-d_{10})/d_{50}$ being not greater than 0.35 corresponding to a high degree of interconnected porosity.

21. A method for making an aluminum titanate ceramic body, comprising the steps of:
providing a mixture of inorganic raw materials comprising an alumina source, a silica source, and a titanium dioxide source, in combination with a source of a metal oxide as a sintering additive in an amount of at least 0.10% by weight super-addition, the source corresponding to an oxide of a metal selected from the group of metals consisting of bismuth, calcium, yttrium, lanthanides and combinations thereof,
shaping the mixture into a body; and
sintering the body to a temperature of between 1375° C. to 1550° C. for a period of between 1 hour to 15 hours, thereby forming a phase of aluminum titanate and a narrow pore size distribution as characterized by the relation $(d_{50}-d_{10})/d_{50}$ being less than 0.50;

wherein a weighted average of median particle diameters of the inorganic raw materials, $D_{50}$, is at least 6 microns to form a median pore size, $d_{50}$, in the aluminum titanate ceramic body after sintering of at least 8 microns.

22. The method of claim 21 wherein the metal oxide is added to the mixture of inorganic raw materials in an amount between 0.10% and 5.0% by weight.

23. The method of claim 21 wherein the alumina source is a selected from a group consisting of corundum, gamma-alumina or another transitional alumina, boehniite, aluminum hydroxide (gibbsite) and mixtures thereof.

24. The method of claim 21 wherein the alumina source has a median particle diameter greater than 15 microns.

25. The method of claim 24 wherein the mixture of inorganic raw materials further includes an aluminosilicate source.

26. The method of claim 25 wherein the aluminosilicate source is selected from the group consisting of mullite, kyanite, sillimanite, kaolin, calcined kaolin, pyrophyllite, and mixtures thereof.

27. The method of claim 21 wherein the silica source is selected from the group consisting of quartz, cristobalite, zeolite, diatomaceous earth, fused silica, colloidal silica, amorphous silica, and combinations thereof.

28. The method of claim 21 wherein the titanium dioxide source is selected from the group consisting of rutile, anatase, amorphous titania, and mixtures thereof.

29. The method of claim 21 wherein the alumina source and titanium dioxide source have median particle or agglomerate diameters of at least 10 microns.

30. The method of claim 21 wherein the metal oxide source is selected from the group consisting of bismuth oxide, calcium carbonate, calcium hydroxide, calcium aluminate, calcium titanate, calcium silicate, yttrium or rare earth oxide, hydroxide, carbonate, fluoride-carbonate, aluminate, silicate, titanate, chloride, nitrate, acetate, or other soluble or insoluble salt, a mixed rare earth concentrate such as bastnasite, calcined bastnasite, or monazite, and combinations thereof.

31. The method of claim 30 wherein the metal oxide source has a median particle diameter of less than 5 microns.

32. The method of claim 21 wherein the step of shaping the mixture further comprises extrusion through a die to form a honeycomb structure.

33. A ceramic body, comprising:
a phase of aluminum titanate and a narrow pore size distribution as characterized by the relation $(d_{50}-d_{10})/d_{50}$ being less than 0.25,
a coefficient of thermal expansion (RT-1000° C.) less than $10 \times 10^{-7}$ $C^{-1}$, and
a porosity of between 45-60% by volume.

34. The ceramic body of claim 33 further comprising a modulus of rupture (MOR) using the four point method on a cylindrical rod, of at least 450 psi.

35. The ceramic body of claim 33 further comprising a modulus of rupture (MOR) using the four point method on a cylindrical rod, of at least 500 psi.

36. The ceramic body of claim 33 further comprising a phase of mullite.

37. The ceramic body of claim 33 further exhibiting a coefficient of thermal expansion (RT-1000° C.) not greater than $10 \times 10^{-7}$ $C^{-1}$.

38. The ceramic body of claim 1 wherein the ceramic body does not contain strontium.

39. The method of claim 21 wherein the mixture of inorganic raw materials does not contain strontium.

40. The ceramic body of claim 33 wherein the ceramic body does not contain strontium.

41. The method of claim 21 wherein the metal oxide source has a median particle diameter of less than 5 microns or is in a water-soluble state.

* * * * *

UNITED STATES PATENT AND TRADEMARK OFFICE
CERTIFICATE OF CORRECTION

PATENT NO. : 7,294,164 B2  
APPLICATION NO. : 11/193123  
DATED : November 13, 2007  
INVENTOR(S) : Gregory A. Merkel Page 1 of 1

It is certified that error appears in the above-identified patent and that said Letters Patent is hereby corrected as shown below:

| No. | Col. | Line | Description |
|---|---|---|---|
| 1 | 31 | 47 | C.") Less" should be --C.) less--. |
| 2 | 33 | 14 | "boehniite" should be --boehmite--. |

Signed and Sealed this

Twenty-seventh Day of May, 2008

JON W. DUDAS  
*Director of the United States Patent and Trademark Office*